US006772155B1

United States Patent
Stegelmann

(12) United States Patent
(10) Patent No.: US 6,772,155 B1
(45) Date of Patent: Aug. 3, 2004

(54) LOOKING DATA IN A DATABASE SYSTEM

(75) Inventor: Rolf Günter Erich Stegelmann, Valencia, CA (US)

(73) Assignee: NCR Corporation, Dayton, OH (US)

( * ) Notice: Subject to any disclaimer, the term of this patent is extended or adjusted under 35 U.S.C. 154(b) by 535 days.

(21) Appl. No.: 09/825,906

(22) Filed: Apr. 4, 2001

(51) Int. Cl.[7] .............................................. G06F 17/30
(52) U.S. Cl. .............................. 707/8; 707/10; 707/101; 707/202
(58) Field of Search .............................. 707/8, 10, 100, 707/201, 203, 206, 101, 202; 711/113, 152; 718/104

(56) References Cited

U.S. PATENT DOCUMENTS

| | | | | | |
|---|---|---|---|---|---|
| 5,430,869 A | * | 7/1995 | Ishak et al. | ................. | 707/101 |
| 5,493,728 A | * | 2/1996 | Solton et al. | ................ | 711/113 |
| 5,721,909 A | * | 2/1998 | Oulid-Aissa et al. | ......... | 707/10 |
| 5,758,356 A | * | 5/1998 | Hara et al. | ................... | 707/202 |
| 5,794,241 A | * | 8/1998 | Loaiza | ........................... | 707/8 |
| 5,832,484 A | * | 11/1998 | Sankaran et al. | .............. | 707/8 |
| 5,835,757 A | * | 11/1998 | Oulid-Aissa et al. | ......... | 707/10 |
| 5,842,196 A | * | 11/1998 | Agarwal et al. | ............... | 707/2 |
| 5,884,327 A | * | 3/1999 | Cotner et al. | ............... | 707/202 |
| 6,052,695 A | * | 4/2000 | Abe et al. | ................... | 707/202 |
| 6,112,209 A | * | 8/2000 | Gusack | ........................ | 707/101 |
| 6,144,983 A | * | 11/2000 | Klots et al. | ................. | 718/104 |
| 6,363,387 B1 | * | 3/2002 | Ponnekanti et al. | .......... | 707/10 |
| 6,418,438 B1 | * | 7/2002 | Campbell | ...................... | 707/8 |
| 6,606,626 B1 | * | 8/2003 | Ponnekanti | .................... | 707/8 |

* cited by examiner

*Primary Examiner*—Shahid Alam
(74) *Attorney, Agent, or Firm*—Trop, Pruner & Hu, P. C.

(57) ABSTRACT

A database system includes a storage module containing a table having plural portions (e.g., rows). A lock manager places a table-level lock on the table for a first transaction, the first transaction updating a first row of the table. The lock manager converts the table-level lock to a lower level lock to lock the first table portion if a second transaction requests an access of the first portion of the table.

30 Claims, 11 Drawing Sheets

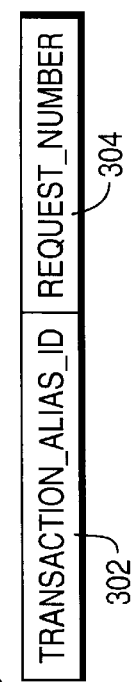
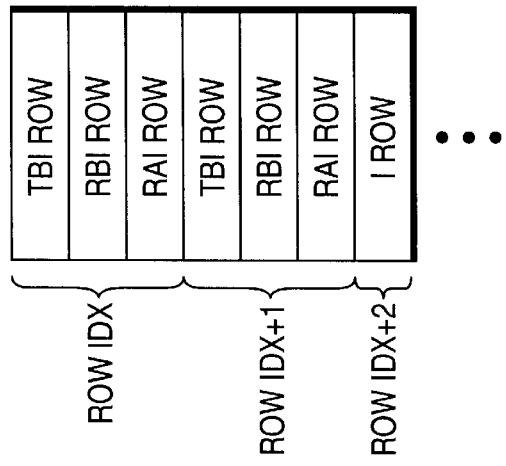
FIG. 3B
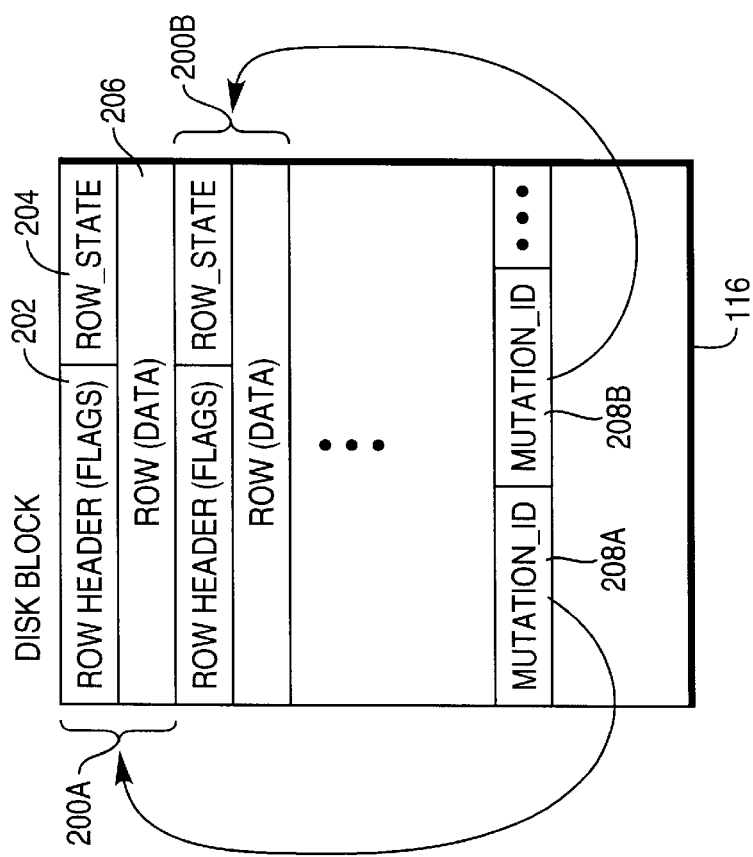
FIG. 3A
FIG. 4

FIG. 8

| FLAGS | MUTATION_ID |
|---|---|
|  | $M_0$ |
|  | $M_1$ |
|  | $M_2$ |
|  | $\vdots$ |
|  | $M_n$ |
|  |  |

ACTIVE MUTATION_ID LIST

LOOKING DATA IN A DATABASE SYSTEM

BACKGROUND

A database is a collection of stored data that is logically related and that is accessible by one or more users. A popular type of database is the relational database management system, which includes relational tables made up of rows and columns. Each row represents an occurrence of an entity defined by the table, with an entity being a person, place, or thing about which the table contains information. Various types of operations can be performed in the database system.

In one arrangement, to extract data from a relational table, Structured Query Language (SQL) statements can be issued to the database system. In response to SQL statements, data is extracted from one or more tables in the database system. SQL statements include data definition language (DDL) statements that are used to define database structures and data manipulation language (DML) statements that manipulate rows and data values. Examples of DML statements include INSERT, SELECT, UPDATE, and DELETE.

Concurrent access to data for read-only queries is generally allowed. However, an update transaction typically blocks all subsequent reads of a table or a row in the table, or vice versa, an update transaction is blocked by all outstanding conflicting reads. Locking prevents multiple users from violating data integrity. Typically, locks are acquired during the processing of a request or transaction and released at the termination of the request or transaction.

Various lock granularity levels are possible, including database, table, hash range, hash, and row locks. A database lock causes all tables in the database to be locked, while a table lock causes all rows in the table to be locked. A hash range lock causes a range of hash values to be locked, while a hash lock specifies a hash value to lock. A row lock locks a specific row in a table. Within each lock granularity, several different levels of locks are possible, including exclusive locks, write locks, read locks, and access locks. An exclusive lock is the most restrictive type of lock, as all other requests are locked out. A write lock enables a request to modify data while locking out all other requests except read requests not concerned about data consistency. A read lock is used to ensure consistency during read operations; several requests may hold a concurrent read lock on the same data, during which no modification of the data is permitted. Typically, users who are not concerned about data consistency can specify access locks. Using an access lock allows for reading of data while modification of the data is in progress.

In many conventional systems, the number of locks that can be held at a given time can be limited. Additionally, even if more locks are provided, having a large number of locks concurrently active at a given time can adversely affect system performance. Consequently, in some systems, table-level locks are generally used to reduce the-number of outstanding locks at any given time. However, a table-level lock can prevent other updates from proceeding, even though the other updates involve different portions of the table.

SUMMARY

In general, a lock mechanism and method is provided to enable the efficient provision of a lower level of locking granularity when needed. For example, a database system comprises a storage module to store a table, the table containing portions of data and one or more indications to indicate corresponding one or more of the data portions being modified. A controller is adapted to perform lock management using the one or more indications contained in the table.

According to another example, a database system comprises a storage module containing a table having plural portions and a lock manager adapted to place a table-level lock on the table for a first transaction. The first transaction updates a first portion of the table. The lock manager is adapted to further establish a lower level lock on the first table portion in response to a second transaction requesting an access of the first portion of the table.

Other or alternative features will become apparent from the following description, from the drawings, and from the claims.

BRIEF DESCRIPTION OF THE DRAWINGS

FIGS. 3A–3B illustrate disk blocks that store portions of a table.

FIG. 4 illustrates a MUTATION_ID field that is stored in the disk block of FIG. 3.

FIG. 8 illustrates an ACTIVE_MUTATION_ID table.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
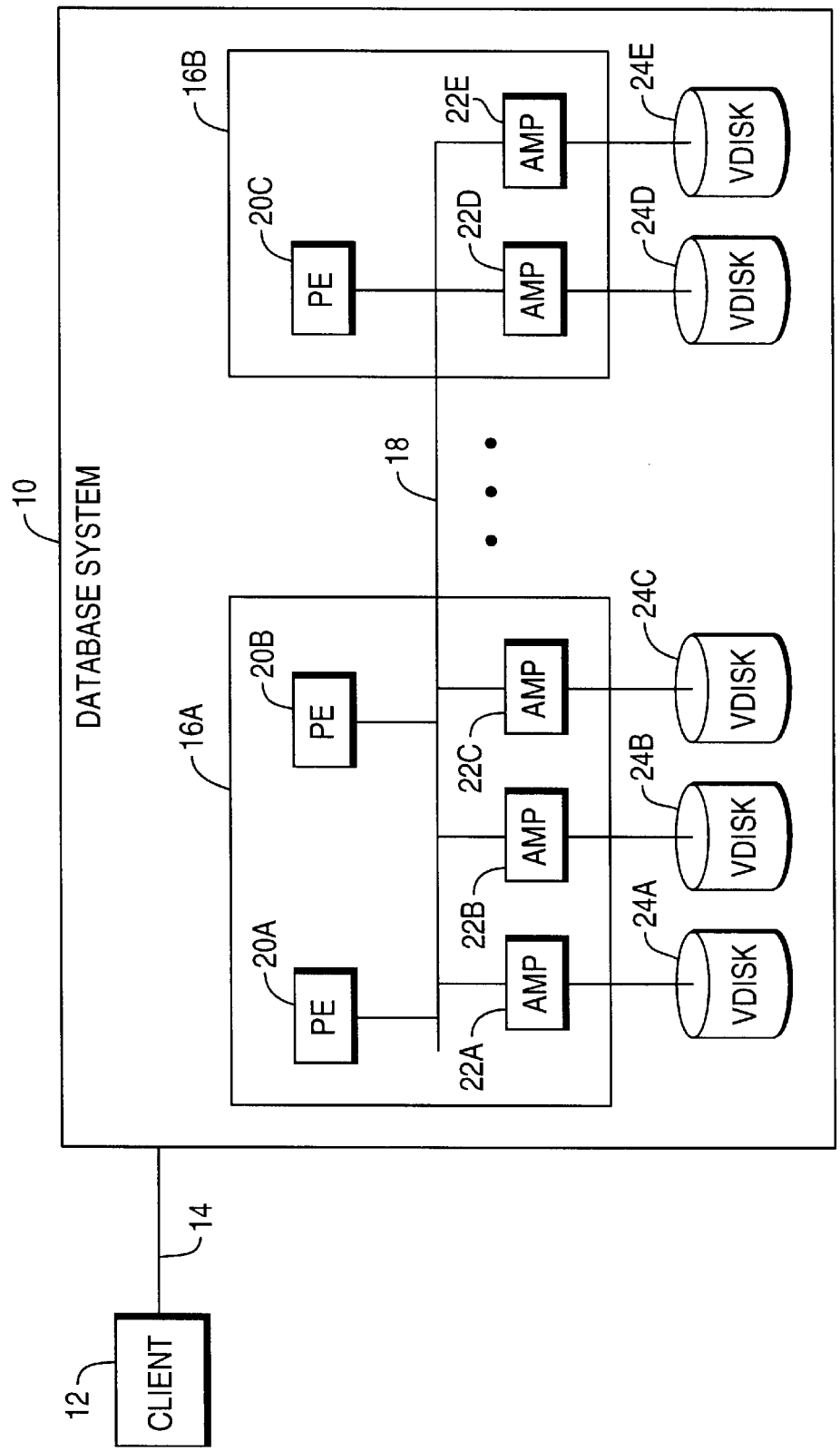
FIG. 1 is a block diagram of an embodiment of a database system and a terminal for accessing the database system.

FIG. 1 illustrates an example of a database system 10 that is coupled to a client system 12 over a network 14. Examples of the network 14 include a local area network (LAN), a wide area network (WAN), or a public network (such as the Internet). The user at the client system 12 can issue requests, such as statements in a standard database-query language. An example of a standard database-query language is the Structured Query Language (SQL) defined by the American National Standards Institute (ANSI). In response to queries, the database system 10 extracts data stored in the database system 10.

SQL provides for data definition language (DDL) statements that define database objects and the relationships that exist among them. Examples of DDL statements include statements to create or modify tables and views. SQL also provides for data manipulation language (DML) statements that manipulate, change, or retrieve data rows of the database. Examples of DML statements include SELECT, UPDATE, DELETE, and INSERT.

In the illustrated embodiment, the database system 10 includes multiple nodes 16A and 16B. The arrangement of the database system 10 in FIG. 1 is provided as an example, as other arrangements are possible in other embodiments. For example, the database system 10 can be a single-node system (with one or plural processors).

In the multi-node database system of FIG. 1, the nodes 16A and 16B are coupled to an interconnect network 18. The nodes 16A and 16B include virtual processors (VPROCs), which include parsing engines (PEs) 20A, 20B, and 20C and access module processors (AMPs) 22A, 22B, 22C, 22D and 22E. The PEs and AMPs are software processes that are executable in corresponding nodes 16A, 16B to enhance concurrency in the execution of disk access tasks. In the example arrangement of FIG. 1, PEs 20A, 20B and AMPs 22A, 22B, and 22C are executable in the node 16A, and PE 20C and AMPs 22D and 22E are executable in the node 16B.

Each PE 20 is made up of the following components: session control block, parser, and dispatcher. The session control block performs user logon and logoff tasks. The parser interprets SQL statements, checks them for proper SQL syntax, and evaluates them semantically. In response to an SQL statement, the dispatcher in the PE 20 controls the sequence of steps that are executed and passes the steps to the AMPs 22. The dispatcher also receives status reports from the AMPs as they process the steps. Depending on the SQL request, a step may be sent to one AMP, a number of AMPs, or all AMPs.

Each AMP 22 manages a portion of the database and performs the following example tasks on the database: sorting, aggregating, formatting and converting. Each AMP 22 includes a database manager that locks databases and tables; creates, modifies, or deletes definitions of tables; inserts, deletes or modifies rows within the tables; and retrieves information from definitions and tables. A database manager also returns responses to the dispatcher in a PE 20.

As further shown in FIG. 1, each AMP 22 is associated with a disk 24 that contains data associated with a portion of the database. The total disk space associated with each AMP is referred to as a "virtual disk (VDISK)." As shown in FIG. 1, the AMPs 22A–22E are associated with respective disks 24A–24E. More generally, the database system 10 includes one or more query coordinators to parse queries into actions to be performed on data stored in storage modules. Access to data in storage modules is provided by one or more access modules, which are responsible for managing tables in the storage modules and performing operations (e.g., sorting, aggregating, formatting, converting, etc.) with respect to data in those tables. Each access module responds to a step (or other specified action) transmitted by a parsing engine, query coordinator, or other element capable of parsing a query.

Pseudo Read and Pseudo Write Lock Mechanism

In accordance with some embodiments, a pseudo_read lock, a pseudo_write lock, and a row-level (write or read) lock are implemented as part of the overall lock mechanism in the database system 10. The pseudo_read and pseudo_write locks enable the use of a low-level granularity for locking (e.g., row-level locks) on an as needed basis. However, to avoid excessive overhead associated with a large number of active row-level locks, the pseudo_write and pseudo_read locks are table-level locks until an actual row-level conflict is detected. Thus, a pseudo_read or pseudo_write lock is generally placed as a table-level lock; that is, the pseudo_read lock or pseudo_write lock places a lock on an entire table (and not on a row or other portion of the table). However, if a conflict is detected between two operations, then a row-level read or write lock is established to resolve the conflict.

In addition to providing a pseudo_read lock, pseudo_write lock, and row (write or read) lock, the lock mechanism of the database system 10 also optionally provides an exclusive lock and an access lock. Additionally, hash-level locks may be employed in other embodiments. Table 1 below shows compatibility of the pseudo_write and pseudo_read locks with other locks of the database system 10.

TABLE 1

|  | Exclusive | Write | Pseudo_<br>Write | Read | Pseudo_<br>Read | Access |
|---|---|---|---|---|---|---|
| Exclusive | block | block | block | block | block | block |
| Write | block | block | block | block | block | grant |
| Pseudo_<br>Write | block | block | grant | block | grant | grant |
| Read | block | block | block | grant | grant | grant |
| Pseudo_<br>Read | block | block | grant | grant | grant | grant |
| Access | block | grant | grant | grant | grant | grant |

As shown in Table 1, an exclusive lock placed on a data portion (a table or a row of the table) blocks all other attempted locks. A write lock blocks all subsequent attempted locks except an access lock. An access lock is requested by an operation that does not care about data consistency. A pseudo_write lock blocks an attempted exclusive lock, a write lock, or a read lock, but does not block another pseudo_write lock, a pseudo_read lock, or an access lock. A read lock blocks an attempted exclusive lock, a write lock, or a pseudo_write lock, but allows the grant of a read lock, a pseudo_read lock, and an access lock. A pseudo_read lock blocks an attempted exclusive lock or a write lock, but enables the grant of a pseudo_write lock, a read lock, a pseudo_read lock, or an access lock. An access lock enables the grant of all locks except an attempted exclusive lock.

The pseudo_write lock and pseudo_read lock mechanism is enabled by maintaining multiple images of a row in the table that is being modified (e.g., added, deleted, or updated) by a request or a transaction. As used here, a transaction is the overall operation that is to be performed on one or more rows of a table. Each transaction includes one or more requests. For example, in one transaction, a first request adds a first row, a second request updates the first row, another request deletes a second row, and so forth. For each row that is being updated, a special identifier is used to indicate the modification or "mutation." The special identifier is referred to as the mutation identifier or MUTATION_ID.

In addition to the mutation identifiers or MUTATION_IDs, state identifiers are provided to identify the state of each row, such as a "before image" row and an "after image" row. A before image row represents a row before a modification or "mutation" operation is performed. A modification operation refers to any operation (transaction or request) in which a portion of a table is being changed. An after image row represents the latest row as processed by a current modification operation. A before image row is retained in each table for as long as the transaction that created or updated the row is active. As soon as the transaction commits successfully, the before image rows become reusable and can be reused by another request or transaction. The state identifier associated with each row can also indicate that a "mutation" is not being performed on a row; that is, an operation that modifies the contents of the row is not currently being performed on the row. Although reference is made to maintaining plural images of table rows in the described embodiments, plural images of other portions of a table can be maintained in other embodiments.

In addition to enabling the pseudo_write and pseudo_read lock mechanism, maintaining plural images of each row in a table also provides an efficient mechanism to roll back to the original state of the row if an abort occurs during an operation in which one or more rows of a table are being modified. A rollback operation refers to the procedure for recovering a prior state of a row (or other portion) of a table before the modification operation is performed. For each row that is subject to a modification operation, the original row is marked as the before image row. For example, the original row becomes the before image row if the modification operation is a row delete operation. If the modification operation is an update operation of a row, then the original row is marked as the before image row and a new row (containing the updated information) is created and marked as the after image row. By keeping plural images of each row in the table that is subject to a modification operation, the plural images are readily accessible to a user even during an abnormal condition, such as after the system restart due to an abort or a system crash.

If an operation that is modifying a table or row should abort or fail for some reason, the before image row becomes the current row and the after image row can be discarded. Another benefit offered by some embodiments is that contents of a row are accessible by a user even though a rollback is being performed. As a result, users do not have to wait for a rollback operation to complete for access to data, including data that are the target of modification at the time of the abort.

A further benefit of keeping plural images is the ability to provide a consistent view of each table when performing read accesses, even while the accessed rows or other table portions are being modified by another operation. The ability to provide a consistent view of a table portion despite a concurrent modification of the table portion is referred to as "stability read mode." By keeping before and after images of each row that is being modified, the before image of a row requested by a stability read mode query is returned. By consistently providing the before image in response to read requests, a consistent view of each row during an update transaction is enabled.

Figure 2:
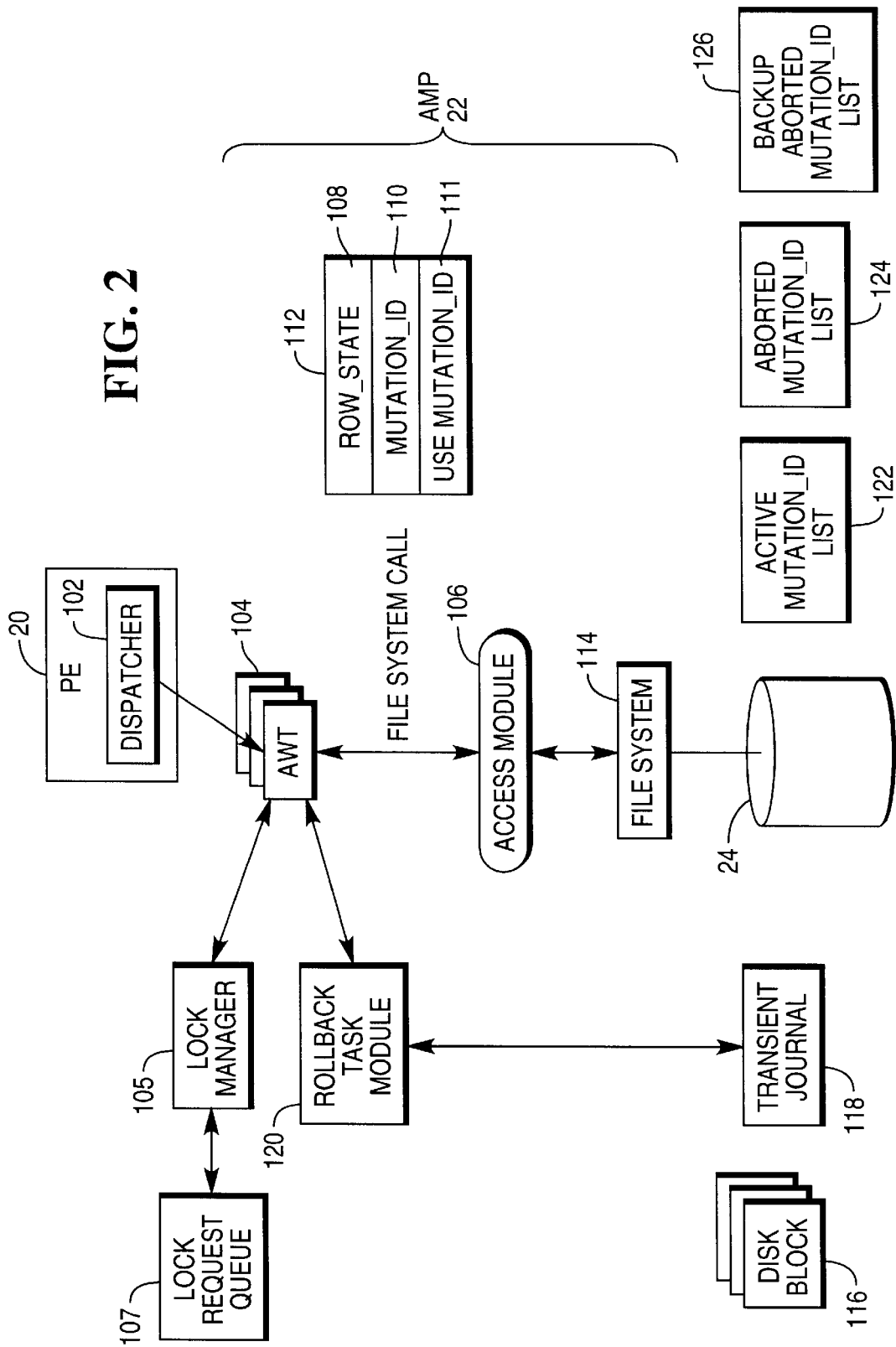
FIG. 2 is a block diagram of a portion of the database system of FIG. 1.

FIG. 2 shows some components of the PE 20, the AMP 22 and a disk 24, in accordance with an example arrangement. A dispatcher 102 in the PE 20 passes requests to AMP worker tasks (AWTs) 104 in the AMP 22 as a sequence of steps. One or more AWTs 104 perform actions requested by the dispatcher 102.

The AMP 22 also includes a lock manager 105 that, in conjunction with the AWT 104, implements the pseudo_write and pseudo_read lock mechanism in accordance with some embodiments. An access module 106 enables the creation and processing of multiple images of each row of a table that is being modified. The access module 106 effectively provides a middle layer between a file system 114 and the AWTs 104 to properly handle the plural images of each row. In some embodiments, the lock manager 105 is part of the file system 114.

The row images are tracked using identifiers that include a ROW_STATE field 108 and a MUTATION_ID field 110 contained in a context block 112. The ROW_STATE field 108 and MUTATION_ID field 110 are updated when a modification operation (transaction or request) is performed on a row, with the ROW_STATE and MUTATION_ID fields passed by an AWT 104 in a file system call. The context block 112 also contains a USING_MUTATION_ID flag that is set to true if the MUTATION_ID field 110 is contained in the context block 112. The file system call is passed through the access module 106 to a file system 114 that performs accesses of tables in the disk 24. In one embodiment, each table is stored in disk blocks 116 in the disk 24. The contents of an example disk block 116 are illustrated in FIG. 3A.

A transient journal 118 is also contained in the disk 24 to store a table identifier (TABLE_ID), row identifiers (ROW_IDs), locking information, and the MUTATION_ID information of rows that have been deleted, inserted, and updated (that is, subjected to a modification operation). In one embodiment, the transient journal 118 does not store a copy of the before image of a row that is being modified, which avoids the need to copy a potentially large row from a table to the transient journal each time an operation modifies the content of a row. If an abort of a modification operation is detected, then a rollback task 120 uses the row IDs in the transient journal 118 to remove after image rows in a table of the affected rows.

The database system also maintains an ACTIVE_MUTATION_ID list 122, an ABORTED_MUTATION_ID list 124, and a BACKUP_ABORTED_MUTATION_ID list 126, with the MUTATION_ID list 122 and ABORTED_MUTATION_ID list 124 stored in the disk 24, and the BACKUP_ABORTED_MUTATION_ID list 126 stored on a backup AMP on a different node. When a modification operation is aborted, the ABORTED_MUTATION_ID list 124 is transmitted to a backup AMP for storage as the BACKUP_ABORTED_MUTATION_ID list 126. This ensures that if the ABORTED_MUTATION_ID list 124 becomes unavailable for some reason, the BACKUP_ABORTED_MUTATION_ID list 126 can be used to reactivate the before images and delete the after images. The lists 122, 124 and 126 are all retained within a crash proof area of the database system. For example, the lists 122 and 124 are kept on allocated portions of the disk 24 or some other form of non-volatile memory. Similarly, the list 126 is kept on allocated portions of a disk or other non-volatile memory associated with the backup AMP on a different node.

For each active transaction or request, a MUTATION_ID is added to the ACTIVE_MUTATION_ID list 122. The list is in general not larger than the number of concurrent transactions and requests associated with the AMP 22. When a transaction or request is aborted, the corresponding MUTATION_ID is added to the ABORTED_MUTATION_ID list 124. The ABORTED_MUTATION_ID list 124 also contains a flag to indicate whether it is the request or transaction that is aborting.

FIG. 3A shows an example disk block 116, which stores a portion of a table. As shown in FIG. 3A, each row 200 in the disk block 116 includes a row header 202 that contains various flags, the ROW_STATE field 204, and the row data 206. In addition, MUTATION_ID fields 208A and 208B (if present) point to respective rows 200A and 200B. Alternatively, the MUTATION_ID fields 208 may be kept in each row 200 instead of as a pointer in a separate portion of the disk block 116. The MUTATION_ID fields 208 are present only if the ROW_STATE field indicates a row is subject to a modification operation.

The ROW_STATE field 204 has four possible values, in accordance with one embodiment, as illustrated in Table 2 below:

TABLE 2

| ROW_STATE | Description |
| --- | --- |
| 00 | Image (I) |
| 01 | Transaction Before Image (TBI) |
| 10 | Request Before Image (RBI) |
| 11 | Request After Image (RAI) |

A ROW_STATE value of 00 (binary value) indicates that there are no current changes associated with this row (the current image or I) and that there is no MUTATION_ID information. A binary value 01 indicates that the row is the before image of a transaction (TBI) and that a MUTATION_ID exists. This status is generated every time an existing row is being modified for the first time (in a new transaction). A binary value of 10 represents that the row is the before image of a request (RBI). This row status exists if the same row is modified more than once for the same transaction. A binary value of 11 represents that the row is the request after image (RAI); that is, the row is the latest row and contains modified data.

As shown in FIG. 3B, in one arrangement, the TBI row, RBI row, and RAI row for each row (associated with a given ROW_ID) appear in order so that the file system 114 does not have to hunt for the several images (if present) of a row. Thus, for example, the TBI row, RBI row, and RAI row of the row having row identifier ROW_IDx are arranged in series, and the TBI row, RBI row, and RAI row of the row having row identifier ROW_IDx+1 are arranged in series. However, the row having row identifier ROW_IDx+2 is not being modified so that only the current image (I) of the row is stored in the table.

As shown in FIG. 4, the MUTATION_ID field 208 includes two parts: a TRANSACTION_ALIAS_ID portion 302 and a REQUEST_NUMBER portion 304. The TRANSACTION_ALIAS_ID portion 302 is an identifier associated with an active transaction. The number increments for each new transaction created in the AMP 22 (the TRANSACTION_ALIAS_ID value is assigned one per transaction per AMP). A restart of the system does not reset the value of TRANSACTION_ALIAS_ID. The REQUEST_NUMBER portion 304 is a number that identifies a request associated with a transaction. Within a given transaction, one or more requests are performed one at a time.

Each MUTATION_ID is thus associated with a transaction-request number pair (corresponding to a unique combination of the TRANSACTION_ALIAS_ID and REQUEST_NUMBER). A MUTATION_ID value is allocated when a transaction is received by an AMP, and the MUTATION_ID value is updated when a new request in the same transaction is received. The MUTATION_ID value is added to an entry of a table corresponding to the modified row as well as to the ACTIVE_MUTATION_ID list 122. The MUTATION_ID value is maintained for as long as a transaction has not committed. SQL provides a COMMIT statement that makes "permanent" all changes performed in a current transaction. After a transaction has been committed, the access module 106 removes the MUTATION_ID associated with a request from the ACTIVE_MUTATION_ID list 122 (FIG. 2).

If a transaction abort or a request abort occurs, then appropriate processing of the affected row is performed by the rollback task 120 (FIG. 2). The corresponding MUTATION_ID is also added to the ABORTED_MUTATION_ID list 124. At the completion of the abort operation, the rollback task 120 marks the TBI row as the current row (that is, the row state of the TBI row is changed to indicate that the row is the current image row). The rollback task 120 also deletes, or marks as available for reuse, the RAI row.

The file system 114 bases its decision on how to handle requests for accesses to rows in a table on information in the MUTATION_ID field 110 of the context block 112, the MUTATION_ID field 208 in the disk block 116, the value of the ROW_STATE field 204 in each row, the content of the ACTIVE_MUTATION_ID list 122, and the content of the ABORTED_MUTATION_ID list 124.

Figure 5:
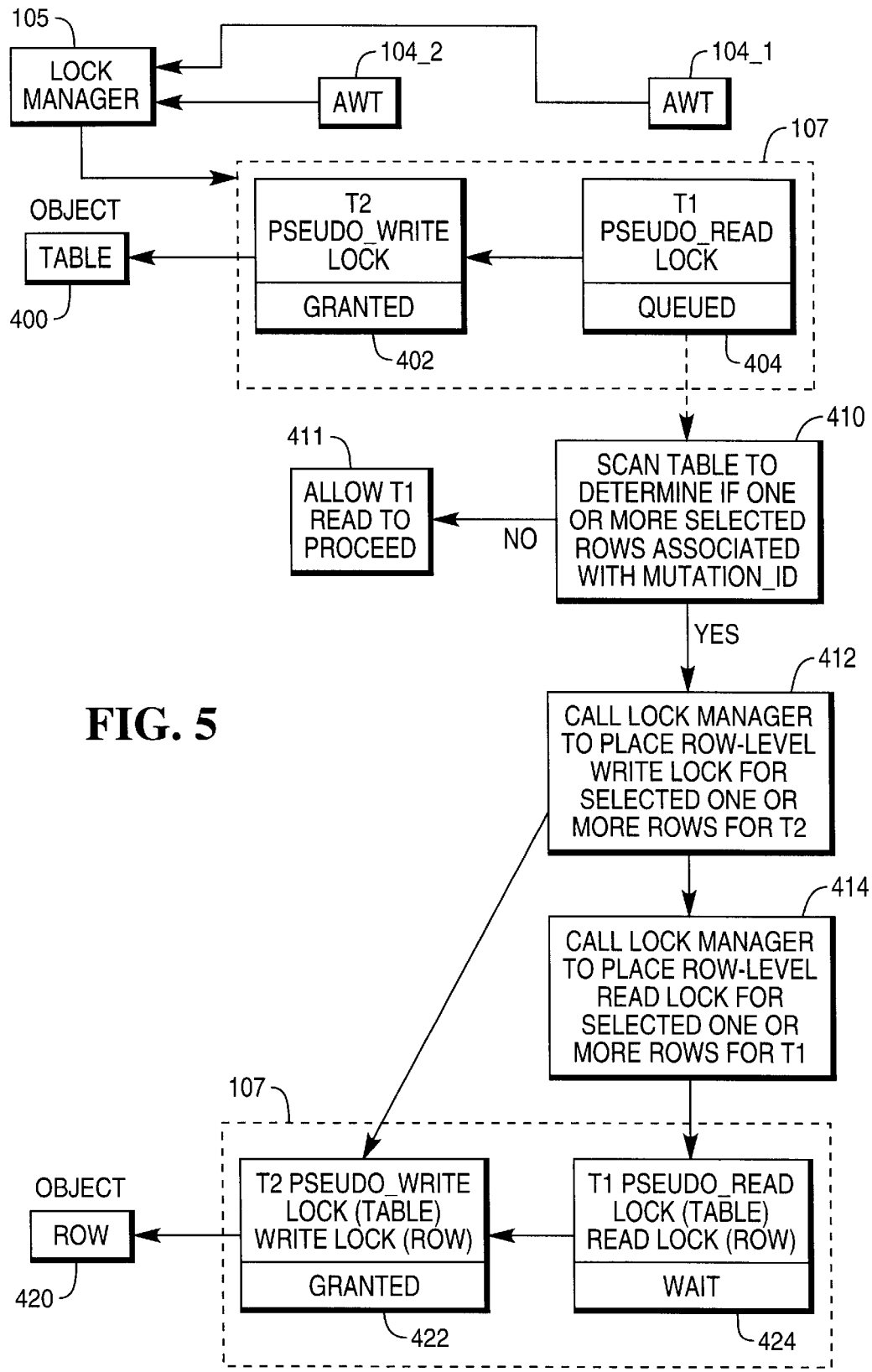
FIG. 5 illustrates the processing of plural transactions associated with respective pseudo_write and a pseudo_read locks.

FIG. 5 shows one example of the pseudo_write and pseudo_read lock mechanism in the context of two transactions T1 and T2. Each transaction T1 or T2 is processed by one or more AWTs 104 (FIG. 2). For example, one AWT 104 processes requests in transaction T1, while another AWT processes requests in transaction T2. It is also possible for the same AWT to process requests for both transactions T1 and T2, or for multiple AWTs to process requests for each transaction T1 or T2. In the ensuing description, it is assumed that an AWT 104_1 processes requests for transaction T1, while an AWT 104_2 processes requests for transaction T2.

Each of the two transactions T1 and T2 is performing an operation (or plural operations) on a table 400, which is the "object" of the two transactions T1 and T2. In transaction T2, a request has been issued to perform a write. To obtain a lock, the AWT 104_2 for transaction T2 calls the lock manager 105 (FIG. 2), which issues a pseudo_write lock to transaction T2, as indicated generally at 402. At this point, the pseudo_write lock is a table-level lock. A read request is issued (by the AWT 104_1) in transaction T1, also for data in the table 400. To obtain a lock, the AWT 104_1 for transaction T1 also calls the lock manager 105, which issues a pseudo_read lock to transaction T1, as indicated generally as 404. Again, the pseudo_read lock is a table-level lock.

The pseudo_write lock 402 and pseudo_read lock 404 are placed into a lock request queue 107 (FIG. 2). If there are no conflicts with other transactions, the pseudo_write lock 402 is granted for transaction T2. The pseudo_read lock 404 is granted also if there are no conflicts with other transactions for transaction T1.

To determine if a conflict exists between the update and read transactions T2 and T1, the ROW_STATE and MUTATION_ID information of an accessed row is determined. Thus, in response to the read request for transaction T1, the AWT 104_1 for transaction T1 scans (at 410) the ROW_STATE value and MUTATION_ID information associated with the row for the read request. If a row is not being updated, then the ROW_STATE field 204 in the accessed data block will so indicate (with a binary value 00), and no MUTATION_ID value will be present. However, if an accessed row is being updated, then the ROW_STATE field 204 will have a non-00 value, and a MUTATION_ID value will be present. If a MUTATION_ID is present for a row being accessed by the read request of transaction T1, then a conflict exists.

If no MUTATION_ID is present, the read request is allowed (at 411) to proceed. However, in response to detection of MUTATION_ID information for a row selected for the transaction T1 read request, the AWT 104_1 (for transaction T1) calls (at 412) the lock manager 105 to place a row-level write lock for transaction T2 (for the row that is the subject of the conflict). In addition, the AWT 104_1 (for transaction T1) also calls (at 414) the lock manager 105 to place a row-level read lock for the row for transaction T1.

At this point, in addition to the pseudo_write and pseudo_read locks, which are table-level locks, respective row-level write and read locks are also created. As shown in FIG. 5, the accessed row (associated with ROW_ID) is the object of the row-level write and read lock. The lock manager 105 places a row-level write lock for transaction T2 in addition to the pseudo_write lock (represented generally as 422), which is granted. Also, the lock manager 105 places a row-level read lock for transaction T1 in addition to the pseudo_read lock (represented generally as 424). Due to the presence of the write lock for transaction T2 on the same row (associated with ROW_ID), the row-level read lock for transaction T1 is blocked in the queue 406 until the update operation has completed (committed or aborted) in transaction T2.

Figure 6:
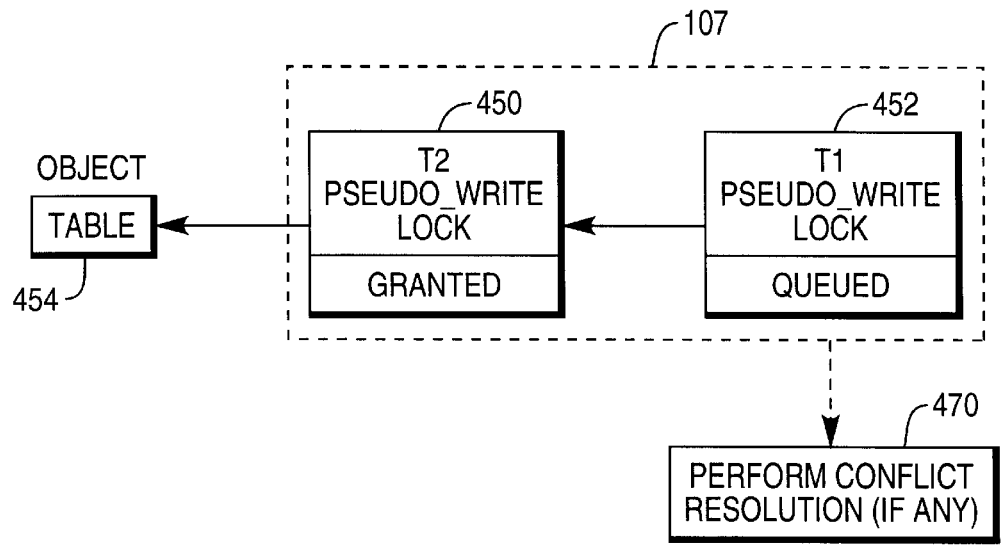
FIGS. 6 and 7 illustrate the processing of plural transactions associated with pseudo_write locks.

FIG. 6 illustrates an example in which two update transactions (T1 and T2) have both issued requests for a table 454. A pseudo_write lock is issued for transaction T2 (indicated as 450). A pseudo_write lock is also issued for the transaction T1 (as indicated by 452). Both pseudo_write locks 450 and 452 are stored in the lock request queue 107. If no other conflicts exist, the pseudo_write lock 450 for transaction T2 is granted, and the write request can proceed to update one or more rows in the table 454. Also, if no other conflicts exist, the pseudo_write lock for transaction T1 is also granted. Also, AWTs for transactions T1 and T2 perform conflict resolution (at 470) to address any conflicts.

In one embodiment, the conflict is handled by the file system 114 (FIG. 2). For example, if update transaction T1 attempts to update a row that is being updated by transaction T2, the file system 114 prevents the update by transaction T1 from occurring until the row update by transaction T2 is finished.

Figure 7:
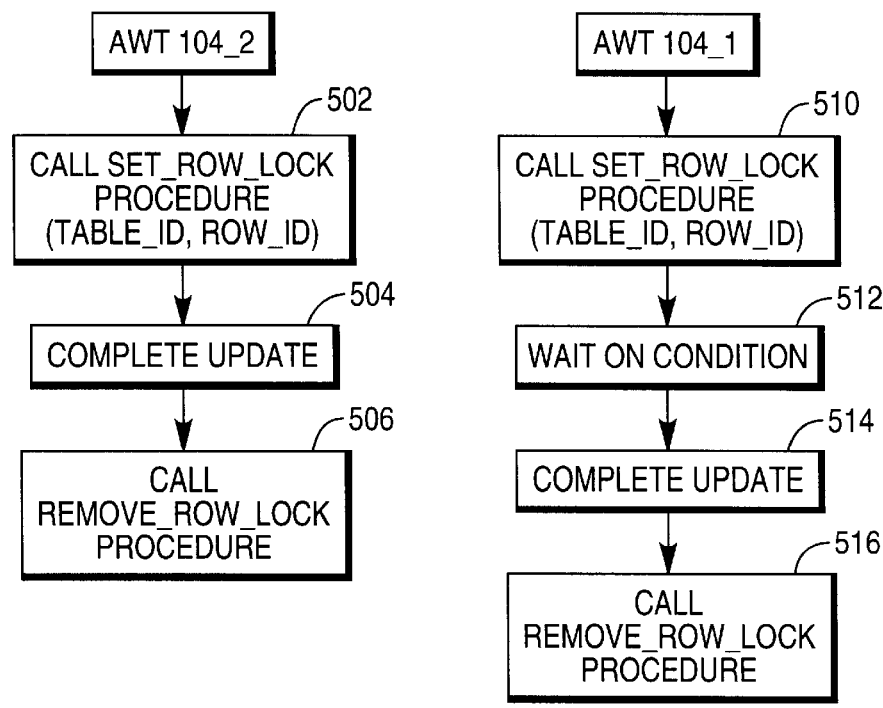

However, the embodiment above assumes that the file system is able to handle such a conflict. In FIG. 7, in accordance with another embodiment of handling conflicts between two pseudo_write locks of two different transactions, a "task lock" logic is used that involves providing a Set_Row_Lock procedure and a Remove_Row_Lock procedure. The Set_Row_Lock and Remove$_{13}$ Row_Lock are relatively simple procedures that are responsible for setting row locks in response to invocation by an AWT. An AWT 104 of an update transaction would call the Set_Row_Lock procedure, passing the table identifier of a target table and Row_ID of a row that is being updated. After an update is completed, the Remove$_{13}$ Row_Lock procedure is called to remove the lock. The idea is that for any given row, only one Set_Row_Lock procedure can be outstanding at any time. As a result, any subsequent update transactions will not be able to invoke the Set_Row_Lock procedure, effectively locking out the task Set_Row_Lock and preventing the update transaction from proceeding.

FIG. 7 shows an example of this "task lock" logic as performed by transactions T1 and T2. Transaction T2 is assumed to be the first to call the Set_Row_Lock procedure for a row having Row_ID in a table (having identifier TABLE_ID). Assuming that there are no other transactions that cause a conflict for the update operation, the AWT 104_2 for update transaction T2 completes the update (at 504). Once the update is completed, the AWT 104_2 for transaction T2 calls the Remove$_{13}$ Row_Lock procedure (at 506) to remove the lock. To improve efficiency, the call to the Remove$_{13}$ Row_Lock procedure contains a pointer to the row lock that is being removed so that searching for the row lock is not required.

Subsequent to transaction T2 calling the Set_Row_Lock procedure (at 502), transaction T1 calls (at 510) the Set_Row_Lock procedure, identifying the same row ROW_ID in the table (TABLE_ID). Since the row is already locked, by the Set_Row_Lock procedure called by AWT 104_2, the Set_Row_Low procedure called by AWT 104_1 waits on a condition (at 512), which in this case is the occurrence of the Remove_Row_Lock procedure being called by AWT 104_2. Once the condition has occurred, AWT 104_1 completes its update (at 514), and after completing the update, calls the Remove$_{13}$ Row_Lock procedure (at 516).

Thus, as can be seen from above, a mechanism is provided to detect for conflicts when two or more transactions are attempting to access a given row. Generally, to reduce the number of row-level locks that are active at a given time, table-level locks are issued by the lock manager 105 by using the pseudo_write and pseudo_read lock mechanism. However, once a conflict is detected, by using MUTATION_ID information in accordance with some embodiments, a row-level lock is established. Thus, row-level locks are not used until necessary.

Stability Read Mode Mechanism

In accordance with another feature of some embodiments of the invention, to enable access to data that is being updated, queries use an access lock (referred to as an "access table-level lock") in conjunction with a "stability read mode" mechanism. The access lock feature enables read requests access to data that is being updated, while the stability read mode feature provides a consistent view of the database to all data at a given point in time, even while there are concurrent updates to the data. Thus, "stability read mode" as used here refers to a mode in which a database system is able to provide a consistent view of data to plural read requests, despite the presence of concurrent updates of the data.

As used here, a stability read mode transaction or request refers to a transaction or request that is performed in stability read mode. With the stability read mode feature, many applications that would otherwise use read locks can now use access locks. For example, an archival job can run concurrently with update transaction(s), since the stability read mode feature provides the archival job with a consistent view of the database despite the one or more concurrent update transactions. Stability read mode is also enabled by maintaining multiple images of a row in the table that is being modified (e.g., added, deleted, or updated) by a request or transaction.

FIG. 8 illustrates the ACTIVE_MUTATION_ID list 122, which has a number of entries 602 according to one example. Each entry 602 contains a MUTATION_ID value $M_i$, $0 \leq i \leq n$, where n is some predefined system limit. A new entry $M_i$ (representing a MUTATION_ID value) is added to the list 122 when a new transaction starts.

Each new entry $M_i$ has a defined relationship with the other existing entries. In one embodiment, the relationship is referred to as a CONCURRENT_MUTATION_ID set, denoted by the symbol $S_i$:

$$S_i = \{M_0, \ldots, M_{i-1}\}, \text{ for } M_i. \tag{Eq. 1}$$

Generally, each set $S_i$ is associated with a MUTATION_ID value $M_i$ of a stability read mode transaction. The set $S_i$ will exist for as long as $M_i$ exists. In general, each set $S_i$ contains MUTATION_ID values for update transactions (transactions in which data is being modified), which are referred to as $_uM_i$. A stability read mode transaction is designated as $_aM_i$. In one embodiment, the designation of a transaction as being an update transaction or a stability read mode transaction is performed by setting flags 404 associated with the MUTATION_ID entries. The set $S_i$ represented in Eq. 1 defines a relationship when an "exclusive" option of stability read mode is used. When using the exclusive option, updates made by the current transaction can be seen by subsequent reads. The set $S_i$ in Eq. 1 is referred to as an "exclusive" set. Although updates by the current transaction $M_i$ can be seen by subsequent read requests, the updates made by update transactions $M_0, \ldots M_{i-1}$ in the set $S_i$ cannot be seen by subsequent reads.

Alternatively, another option of stability read mode is an "inclusive" option, in which updates made by a current transaction are not seen by other requests in the transaction. If the inclusive option is selected, then the set $S_i$ is referred to as an "inclusive" set, which is represented below in Eq. 2:

$$S_i = \{M_0, \ldots, M_i\}, \text{ for } M_i. \tag{Eq. 2}$$

Thus, with the "inclusive" option, updates made by transaction $M_0, \ldots M_i$ in set $S_i$ cannot be seen by subsequent read requests. The exclusive or inclusive option is useful for cursor operations as defined by the ANSI standard, in which an application is able to read and/or update one row at a time.

The following provides an example of defining sets $S_i$ for a number of transactions each associated with a MUTATION_ID value. In the example, the following MUTATION_ID values are present: $_uM_0$, $_aM_1$, $_uM_2$, $_uM_3$ and $_aM_4$. Thus, there are two pending stability read mode transactions (or stability read mode access transactions), $_aM_1$ and $_aM_4$. The sets defined for the two stability read mode transactions (exclusive option in this example) are as follows:

$$S_1 = \{_uM_0\}, \text{ for } _aM_1,$$

and $$S_4 = \{_uM_0, _uM_2, _uM_3\}, \text{ for } _aM_4.$$

Thus, in the example, read requests in the stability read mode transaction $_aM_1$ will be unable to see updated data (the after images) of the $_uM_0$ transaction, which is a member of set $S_1$. Instead, the before images of the $_uM_0$ transaction are returned in response to read requests of the $_uM_0$ transaction. Similarly, for read requests in the stability read mode transaction $_aM_4$, the after images of update transactions $_uM_0$, $_uM_2$, and $_uM_3$ (members of set $S_4$) will not be seen by read requests in the transaction $_aM_4$. Instead, the before images of data in the $_uM_0$, $_uM_1$, or $_uM_3$ transaction are returned for the $_aM_4$ read requests.

In the example above, the MUTATION_ID $_uM_0$ is a "formal" member of set $S_1$. However, when subsequent (subsequent to $_aM_1$) update transactions $_uM_2$ and $_uM_3$ are created, the MUTATION_IDs $_uM_2$ and $_uM_3$ become "informal" members of the set $S_1$. Although $_uM_2$ and $_uM_3$ are not expressly defined as members of the set $S_1$, they are informal members in the sense that read requests of transaction $_aM_1$ will not see updates (after images) of transactions $_uM_2$ and $_uM_3$. Thus, in one embodiment, MUTATION_IDs larger than the MUTATION_ID $M_i$ associated with the CONCURRENT_MUTATION_ID set $S_i$ is considered to be an informal member of the set.

Once a CONCURRENT_MUTATION_ID set $S_i$ is created, it is removed when the corresponding transaction the set is associated with terminates. An individual active update MUTATION_ID value ($_uM_i$) is deleted when the update transaction is not a member of any other CONCURRENT_MUTATION_ID set.

However, when a transaction $_uM_i$ does terminate but it appears on any CONCURRENT_MUTATION_ID set, the active update MUTATION_ID value ($_uM_i$) becomes a dormant MUTATION_ID value designated by $_um_i$. For example, for the CONCURRENT_MUTATION_ID sets above, when the transaction for active MUTATION_ID value $_uM_0$ terminates, the value $_uM_0$ becomes $_um_0$. In the ACTIVE_MUTATION_ID list 122 (FIG. 9), this can be indicated by a DORMANT flag in the flag section 604 of the list 122. In other embodiments, other techniques can be used to indicate a predetermined special state of a terminated update transaction whose identifier cannot yet be eliminated.

The existing CONCURRENT_MUTATION_ID sets are then rewritten as:

$$_uM_0 \rightarrow _um_0,$$

$$S_1 = \{_um_0\}, \text{ for } _aM_1,$$

and $$S_4 = \{_um_0, _uM_2, _uM_3\}, \text{ for } _aM_4.$$

Thus, the MUTATION_ID ($_um_0$) entry is not removed even though the corresponding transaction has been terminated. If a new stability read mode transaction (corresponding to $_aM_5$) is started, then the following sets are present:

$$S_1 = \{_um_0\}, \text{ for } _aM_1,$$

$$S_4 = \{_um_0, _uM_2, _uM_3\}, \text{ for } _aM_4,$$

and $$S_3 = \{_uM_2, _uM_3\}, \text{ for } _aM_5.$$

The new set $S_5$ does not contain the MUTATION_ID value $_um_0$ associated with transaction 0 since that transaction has already terminated. If $_aM_1$ and $_aM_4$ terminate, then the remaining sets are as follows:

$$S_{1} = _um_0, \text{ for } _aM_1, \rightarrow \{\emptyset\}$$

$$S_{4} = _um_0, _uM_2, _uM_3, \text{ for } _aM_4 \rightarrow \{\emptyset\}$$

$$_aM_1 \rightarrow \{\emptyset\}$$

$$_aM_4 \rightarrow \{\emptyset\}$$

$$_um_0 \Rightarrow \{\emptyset\}$$

$$S_5 = \{_uM_2, _uM_3\}, \text{ for } _aM_5$$

The MUTATION_ID value $_um_0$ is no longer needed because it is not part of any stability read mode CONCURRENT_MUTATION_ID set.

During operation, one or more update transactions may abort. If so, the aborted update transaction is taken off each CONCURRENT_MUTATION_ID set $S_i$ and placed on the ABORTED_MUTATION_ID list 124 (FIG. 2). The after image of a transaction is ignored by a stability read mode transaction anyway so putting the aborted transaction on the abort list will continue to return the before image.

Further, in one embodiment, a disk block cleanup operation cannot delete any before images for completed transactions until their MUTATION_ID s no longer appear on any CONCURRENT_MUTATION_ID set. A MUTATION_ID that is informally associated with a set can be deleted; however, disk block cleanup operations are prevented from removing any before images for these MUTATION_ID s. This involves a simple comparison to see if the MUTATION_ID is higher than the lowest MUTATION_ID defining a CONCURRENT_MUTATION_ID set.

Figure 9A:
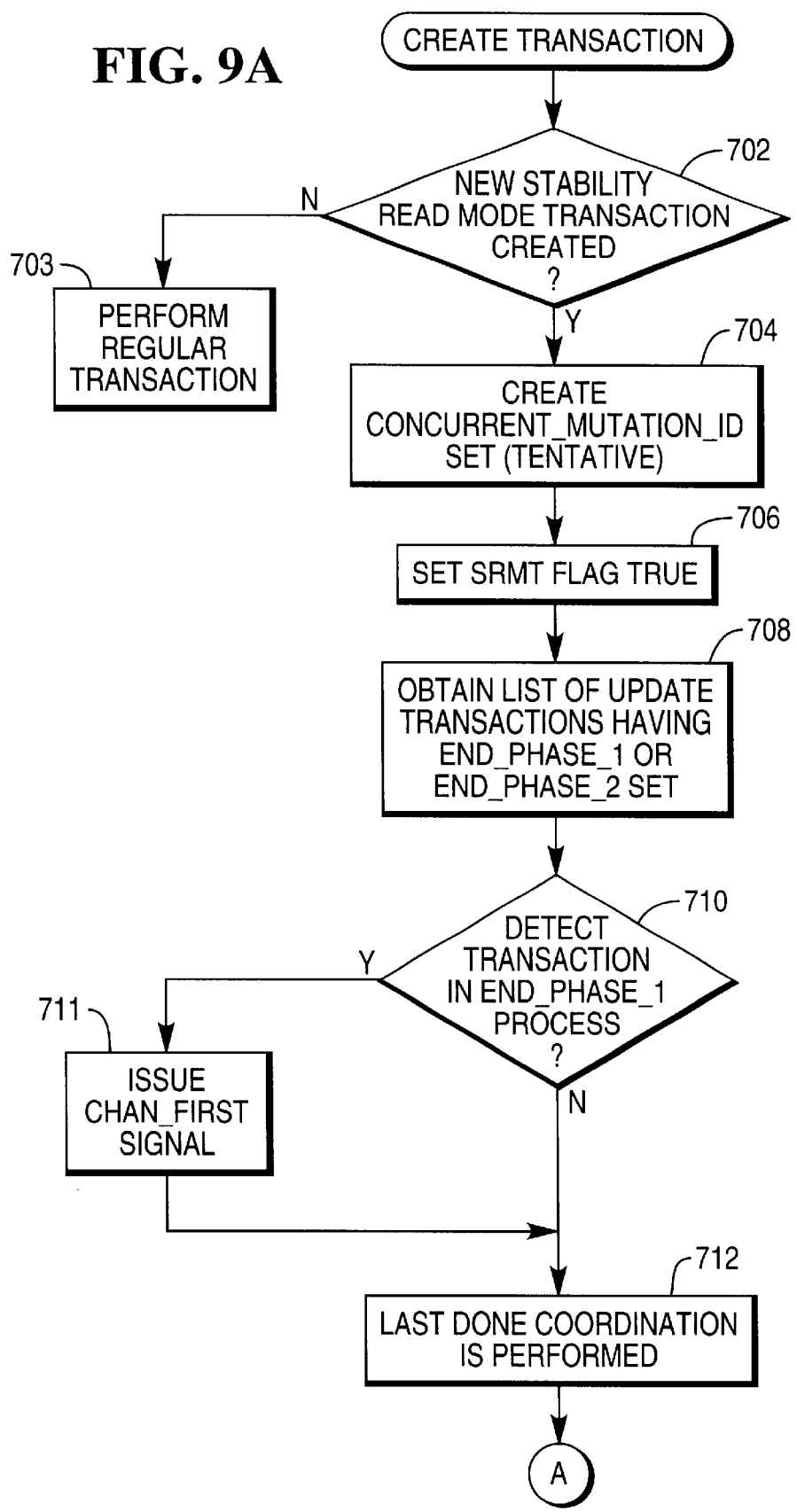
FIGS. 9A–9B are flow diagrams for creating a CONCURRENT_MUTATION_ID set in response to a new transaction.
Figure 9B:
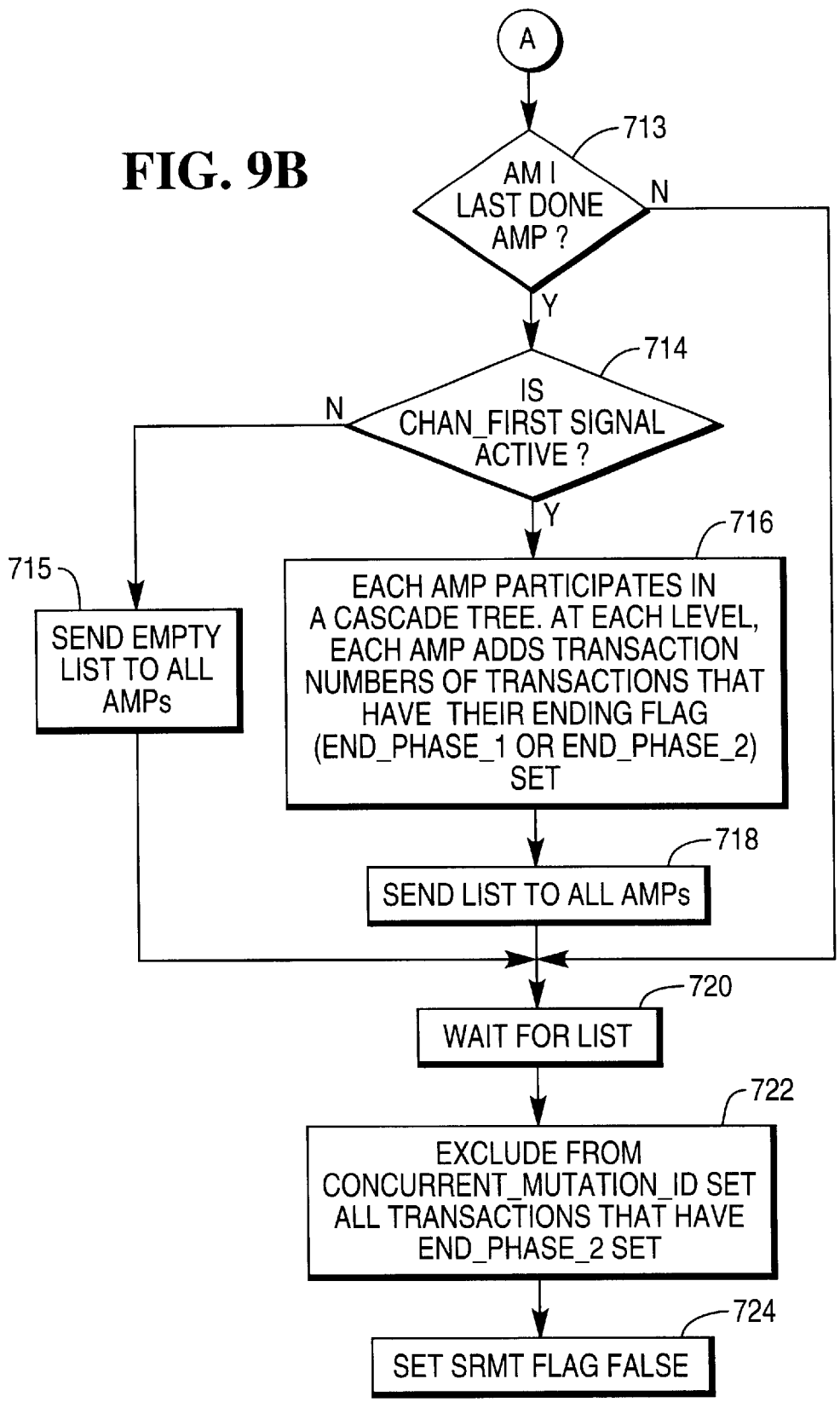

FIGS. 9A–9B illustrate operation of an AMP when a transaction $T_i$ is created. Note that the procedure of FIGS. 9A–9B is repeated in each AMP participating in a given operation. The AMP determines (at 702) if the new transaction that is being created is a stability read mode transaction. If the new transaction is not a stability read mode transaction, then a regular transaction (non-stability read mode transaction) is performed (at 703). However, if the new transaction is a stability read mode transaction, then a CONCURRENT_MUTATION_ID set $S_i$, with i corresponding to transaction $T_i$, is created (at 704). A stability read mode transaction (SRMT) flag, or some other indication, is then set to a true state (at 706) to indicate that a stability read mode transaction is being established. In one embodiment, the SRMT flag is part of the flag section 604 of the ACTIVE_MUTATION_ID list 122.

The CONCURRENT_MUTATION_ID set $S_i$, which at this point is a tentative set, includes all active MUTATION_ID values associated with transactions that have the potential of updating data in the database. By definition, in accordance with one embodiment, existing MUTATION_ID values are smaller in value than the MUTATION_ID value $M_i$ corresponding to the transaction $T_i$ being created.

Next, the AMP obtains (at 708) a list of update transactions having END_PHASE_1 or END_PHASE_2 flags set. In one embodiment, when a transaction is terminated, the transaction goes through an end transaction procedure in which the AMP sets an END_PHASE_1 flag to the true state. If the transaction involves multiple AMPs, then coordination is performed among the AMPs. A last done coordination is performed by each AMP to ensure that all participating AMPs have set their END_PHASE_1 flag. When that occurs, each AMP sets the END_PHASE_2 flag to the true state before terminating completely. The state of the END_PHASE_1 and END_PHASE_2 flags are relevant because it is not necessary to add a transaction that has terminated (that is, the END_PHASE_2 flag is set) to the CONCURRENT_MUTATION_ID set $S_i$.

Based on the list, the AMP detects (at 710) if any transaction is in the END_PHASE_1 procedure. If there is a transaction in the END_PHASE_1 phase, a CHAN_FIRST signal is issued (at 711). If there is no transaction in the END_PHASE_1 phase, the AMP proceeds directly (at 712) to perform last done coordination. In the last done coordination, one of the AMPs is determined to be the last done AMP.

Next, the AMP determines (at 713) if it is the last done AMP. If it is the last done AMP it will be responsible for issuing the cascade message (at 716) that all AMPs participate in. If not, the AMP waits (at 720) for a list of transactions that are either in the END_PHASE_1 or END_PHASE_2 processing stage.

The last done AMP determines (at 714) if the CHAN_FIRST signal is active. If not, then that indicates that the END_PHASE_1 procedure was never really started for any transaction. As a result, the CONCURRENT_MUTATION_ID set created at 704 is the final set and no further processing is needed for creating the set. The last done AMP informs all AMPs of this condition by sending (at 715) an empty list to all AMPs indicating that no transaction is in the END_PHASE_1 or END_PHASE_2 processing stage. The AMP then waits (at 720) for its own empty list it just sent to all AMPs.

However, if the CHAN_FIRST signal is active, indicating that the END_PHASE_1 is active, then each AMP participates (at 716) in a cascade tree. Although reference is made to checking the CHAN_FIRST signal in one embodiment, other mechanisms for checking if end transaction processing is active can be used in other embodiments. At each level of the cascade tree, each AMP adds to a list transaction numbers of transactions that have their ending flag (END_PHASE_1 or END_PHASE_2) set to a true value. In another embodiment, instead of using a cascade tree, some other mechanism can be employed to enable the AMPs to exchange messaging regarding the status of end transaction processing in each AMP.

Next, all AMPs wait (at 720) for the list of transactions that are in END_PHASE_1 or END_PHASE_2 processing. Each AMP excludes (at 722) from the CONCURRENT_MUTATION_ID set the one or more transactions that have END_PHASE_2 set but keeps transactions that have END_PHASE_1 set. Effectively, the CONCURRENT_MUTATION_ID set $S_i$ includes MUTATION_ID values of transactions that have some of the AMPs in the ending phase and some others not in the ending phase. However, MUTATION_ID values of transactions that have all AMPs in the ending phase (END_PHASE_2 flag is set) are excluded from the CONCURRENT_MUTATION_ID set $S_i$.

After the final CONCURRENT_MUTATION_ID set $S_i$ has been determined, the SRMT flag can be set to the false value (at 724) to indicate that establishment of the transaction $T_i$ has completed.

Figure 10:
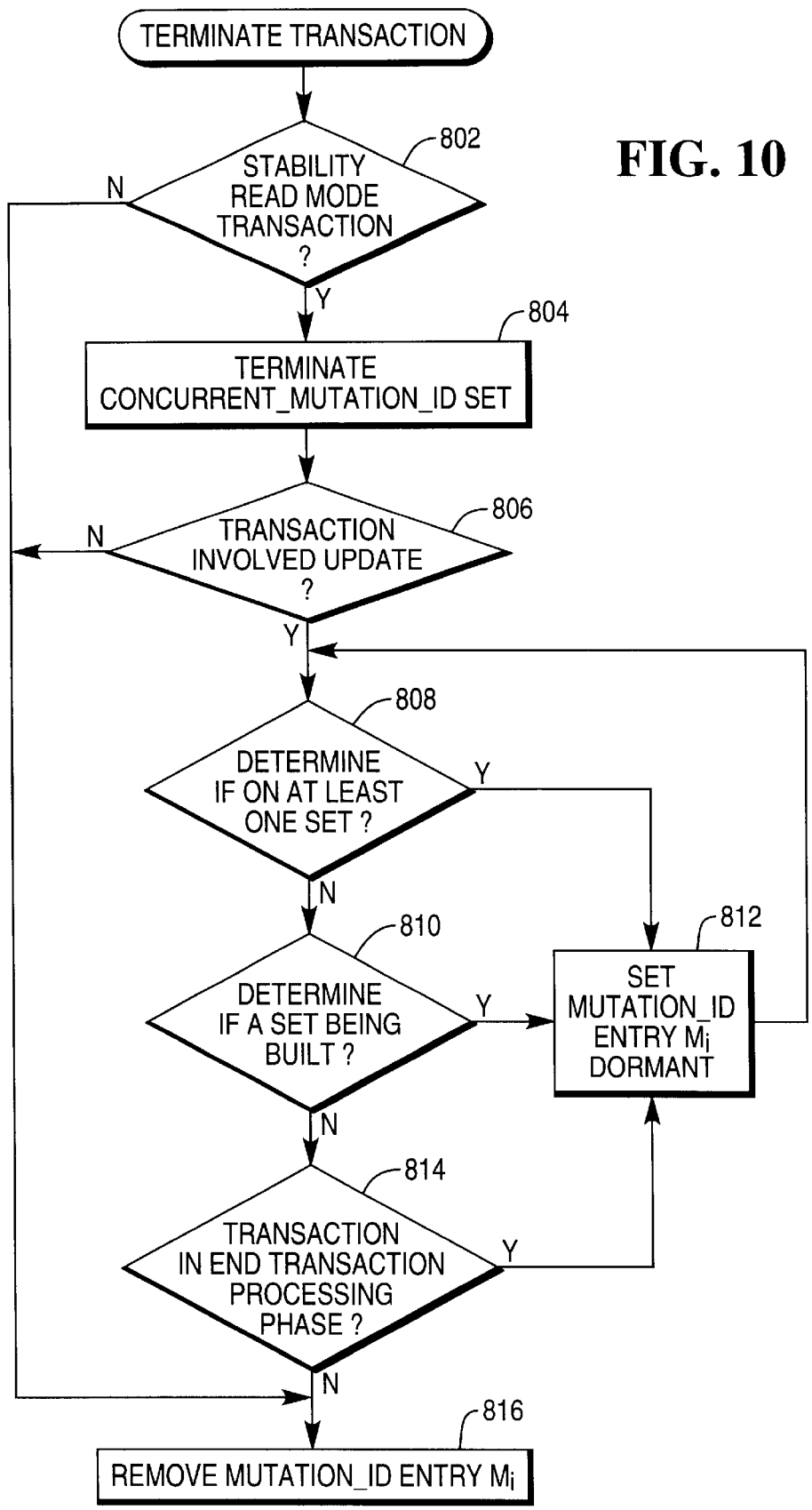
FIG. 10 is a flow diagram of a process of terminating a transaction, in accordance with an embodiment.

FIG. 10 illustrates a process performed by the AMP when a transaction is terminated. The AMP first determines if the terminated transaction is a stability read mode transaction (at 802). If not, then the associated MUTATION_ID entry $M_i$ can be removed (at 816) from the ACTIVE_MUTATION_ID list 122 (FIG. 8).

However, if the terminated transaction is a stability read mode transaction, then the CONCURRENT_MUTATION_ID set $S_i$ associated with the terminated transaction $T_i$ is terminated (at 804). Next, the AMP determines (at 806) if the terminated transaction $T_i$ involved an update of data in the database. If not, the MUTATION_ID entry $M_i$ can be removed (at 816) from the ACTIVE_MUTATION_ID list 122. If the terminated transaction $T_i$ did involve an update, then the AMP determines (at 808) if the MUTATION_ID entry $M_i$ is on at least one CONCURRENT_MUTATION_ID set. While the MUTATION_ID entry $M_i$ remains on a CONCURRENT_MUTATION_ID set, the entry $M_i$ cannot be removed from the ACTIVE MUTATION_ID list 122 even though the corresponding transaction $T_i$ has been terminated. Instead of removing the entry $M_i$, the AMP sets the MUTATION_ID entry $M_i$ to a dormant state (at 812). The dormant MUTATION_ID entry is referred to as $m_i$. Marking a MUTATION_ID for an update transaction to the dormant state is coordinated on all AMPs involved. The MUTATION_ID is marked dormant once all AMPs have completed updates for the transaction.

If the AMP determines (at 808) that the entry $M_i$ associated with the terminating transaction $T_i$ is not on any active CONCURRENT_MUTATION_ID set, then the AMP next determines (at 810) if a CONCURRENT_MUTATION_ID set is being built, as indicated by an SRMT flag in the ACTIVE MUTATION_ID list 122. While a CONCURRENT_MUTATION_ID set is being built, the MUTATION_ID entry $M_i$ associated with the terminating transaction $T_i$ (which involved an update) cannot be removed. Instead, the MUTATION_ID entry $M_i$ is set to the dormant state (at 812).

If the AMP determines (at 810) that a CONCURRENT_MUTATION_ID set is not being built, then the AMP determines (at 814) if the terminating transaction is in the end transaction processing phase. An existing transaction cannot leave the end transaction processing phase until all AMPs associated with the transaction have entered the end transaction processing phase. This means that a MUTATION_ID entry cannot be removed during the end transaction processing phase. Consequently, if a transaction is determined to be in at the END transaction processing phase, then the MUTATION_ID entry $M_i$ is set to the dormant state (at 812). A dormant MUTATION_ID can be removed once the dormant MUTATION_ID is not associated with any CONCURRENT_MUTATION_ID set.

If, however, the AMP determines that the entry $M_i$ associated with the terminating transaction $T_i$ is not on a CONCURRENT_MUTATION_ID set, that a CONCURRENT_MUTATION_ID set is not being built, and that the terminating transaction $T_i$ is not in an end transaction processing phase, then the MUTATION_ID entry $M_i$ can be removed (at 816).

Table 3 below shows processing for a stability read mode request.

TABLE 3

| Row State | On CONCURRENT_ MUTATION_ID set (formally or informally) | Not on CONCURRENT_ MUTATION_ID set |
|---|---|---|
| 00 (I) | Return with pointer to row | Return with pointer to row |
| 01 (TBI) | Return with pointer to row | Ignore row |
| 10 (RBI) | Ignore row | Ignore row |
| 11 (RAI) | Ignore row | Return with pointer to row |

If the data requested by a request is being updated by an update transaction having a MUTATION_ID on a CONCURRENT_MUTATION_ID set (either formally or informally), then that indicates the read request is a stability read mode request. The operation in response to a stability read mode read request is shown in the second column of Table 3. However, if the MUTATION_ID of the transaction is not on a CONCURRENT_MUTATION_ID set, then the read request is a non-stability read mode request. The operation in response to the non-stability read mode is illustrated in the third column of Table 3.

For a row having ROW_STATE with the value 00, the pointer to that row is returned in response to both stability read mode and non-stability read mode read requests, since no modification of the row is currently in progress. However, for a row having ROW_STATE with the value 01, indicating that the row is a TBI row, then the pointer to the TBI row is returned in response to a stability read mode read request. Thus, for stability read mode requests, the data modified by the update transaction is ignored. Rows having ROW_STATE values of 10 (RBI) and 11 (RAI) are ignored in response to a stability read mode read request.

However, in response to a non-stability read mode request, the before image rows (TBI and RBI rows) are ignored. Instead, the RAI row is returned in response to the non-stability read mode request.

Isolation Levels

ANSI SQL defines a transaction as having four possible SQL-transaction isolation levels. The isolation levels are READ UNCOMMITTED, READ COMMITTED, REPEATABLE READ or SERIALIZABLE; that is, unless another isolation level is specified, the SERIALIZABLE isolation level is used. The default level is SERIALIZABLE. The SERIALIZABLE isolation level guarantees that concurrent SQL transactions produce the same effect as some serial execution of those same SQL transactions. The other isolation levels are explained in connection with whether they allow one or more phenomena that can occur during the execution of concurrent SQL transactions. The following are examples of several types of phenomena that can occur during the execution of concurrent SQL transactions.

A "dirty read" phenomenon (P1) occurs when transaction T1 modifies a row and transaction T2 reads the row before T1 performs a commit. If T1 then performs a rollback, T2 will have read a row that was never committed and that may thus be considered to have never existed. A "non-repeatable read" phenomenon (P2) occurs when transaction T1 reads a row, and transaction T2 then modifies or deletes the row and performs a commit. If T1 then attempts to re-read the row, it may receive the modified value or discover that the row has been deleted. A "phantom read" phenomenon (P3) occurs when transaction T1 reads a set of rows N that satisfy some search condition, and transaction T2 then executes SQL statements that generate new one or more rows that satisfy the search condition used by transaction T1. If transaction T1 then repeats the initial read with the same search condition, it obtains a different collection of rows.

The four isolation levels guarantee that each transaction will be executed completely or not at all, and that no updates will be lost. However, the isolation levels are different with respect to phenomena P1, P2, and P3. Table 4 below specifies the phenomena that can occur (or not) for each of the isolation levels.

TABLE 4

| Level | P1 | P2 | P3 |
|---|---|---|---|
| READ UNCOMMITTED | Possible | Possible | Possible |
| READ COMMITTED | Not Possible | Possible | Possible |
| REPEATABLE READ | Not Possible | Not Possible | Possible |
| SERIALIZABLE | Not Possible | Not Possible | Not Possible |

The isolation levels for transactions defined by ANSI are achieved by using mechanisms in the database system 10 according to Table 5 below.

TABLE 5

| Level | Database System Mechanism(s) Required |
|---|---|
| READ UNCOMMITTED | Access locking by query |
| READ COMMITTED | Pseudo_read/write locking by query |
| REPEATABLE READ | Pseudo_read/write & stability read mode by query |
| SERIALIZABLE | Read/Write locking by query |

The SQL-transaction isolation level and access mode defined by the ANSI SQL standard has some ramification on the type of locking that needs to be provided. Briefly the ANSI set transaction statement has the following syntax (not all of it is shown):

| | | | |
|---|---|---|---|
| SET TRANSACTION | [ READ ONLY ] | , | [ READ UNCOMMITTED ] |
| | [ READ WRITE ] | , | [ READ COMMITTED ] |
| | | | [ REPEATABLE READ ] |
| | | | [ SERIALIZABLE ] |

The default for the access mode is READ WRITE and for the isolation level is SERIALIZABLE when not specified. If the transaction access mode is set to READ ONLY, then update/delete statements are not allowed for the transaction.

According to Table 5 above, to implement the SERIALIZABLE isolation level, the database system 10 uses table-level read and write locks. For simpler queries, the database system 10 can employ hash locks via a prime key or unique index.

To implement the REPEATABLE READ isolation level, the database system 10 sets an access or pseudo_read lock and sets the stability read mode flag for all steps involved in an operation resulting from a SELECT statement. For the REPEATABLE READ isolation level, the exclusive form of stability read mode is used. Because of stability read mode, the select operation retrieves data based on the state of an accessed table at the time the request started executing. Stability read mode allows a consistent view of data despite the presence of concurrent updates, which is consistent with the REPEATABLE READ isolation level.

If the REPEATABLE READ isolation level is implemented, then an INSERT/UPDATE/DELETE query results in a pseudo_write lock instead of an access lock. After a transaction inserts or updates a row into a table, a subsequent SELECT statement issued by the same transaction will see the inserted row (since the exclusive form of stability read mode is used). However, the SELECT statement will not see data added by other transactions. Thus, the database system 10 provides an isolation level that is stronger than the REPEATABLE READ isolation level defined by ANSI in that "phantom reads" (phenomenon P3) are not allowed for rows other than ones inserted or updated by current transaction.

If an update is attempted on a row by transaction T1 that is being modified by another transaction T2, then transaction T1 returns an error to the user as an update conflict. The REPEATABLE READ isolation level is a useful implementation of the updateable cursor mode. Cursor mode allows a SELECT statement to read and create a list of rows meeting the selection criteria. Subsequent cursor update statements will generate a warning if the row is being updated by another transaction.

The REPEATABLE READ isolation level is also useful for archival operations. For example, an archival dump reads rows only for those transactions that complete prior to the start of the dump. Anything that is currently being updated will not be seen. The archival job places a pseudo_read lock, which is blocked by an exclusive or write lock.

The database system 10 implements the READ COMMITTED isolation level by using the pseudo_write lock and pseudo_read lock mechanism without the use of stability read mode. The READ COMMITTED isolation level does not provide the repeatable read capability. As a result, the READ COMMITTED isolation level should not be used in some join plans where an input table might be read more than once, because there is no guarantee that the second read will return the same results. Applications such as the retrieval of stock market information or sports score information may be able to use the READ COMMITTED isolation level since they probably do not care that some of the data is changing while the query is running.

Finally, to implement the READ UNCOMMITTED isolation level, the database system 10 uses access locking.

Processing for Rollback Commit, and Abort

Tables 6, 7, and 8 below explain in more detail processing of an abort, commit, or read (non-stability read mode) request, respectively. If a request or transaction is aborted, then the rollback task 120 (FIG. 2) handles each row according to Table 6 below.

TABLE 6

| Row State | Result |
|---|---|
| 01 (ar) | 01 → 00 |
| 01 (at) | 01 → 00 |
| 11 (a) | 11 → x |
| 10 (ar) | 10 → 00 |
| 10 (at) | 10 → x |

If the row state is 01 (TBI row containing the transaction before image), and the abort is a request abort (ar), then the row state is changed from 01 to 00 (the current image state) if the TBI row is associated with the request that aborted. The rollback task 120 also removes the MUTATION_ID associated with the row from the table. If the TBI row is not associated with the request that aborted, the state of the TBI row is not changed.

If the row state is 01 (TBI row), and the abort is a transaction abort (at), then the row state is changed from 01 to 00, and the MUTATION_ID associated with the row is removed from the disk block 116 (FIG. 2).

If the row state is 11 (RAI row), and the abort is either a transaction or request abort (a), then the RAI row is removed and/or marked as reusable (11→x). If the row state is 10 (RBI row), and the abort is a request abort (ar), then the RBI row is made the current row by changing the row state from 10 to 00. However, if the row state is 10 but the abort is a transaction abort (at), then the RBI row is deleted and/or marked as reusable (10→x). The RBI row is not needed since the TBI row is marked as the current image row (ROW_STATE=00).

The rollback processing can proceed on a time available basis. The instance a transaction aborts, the system makes available the before images of all changes made by the aborted transaction to all new transactions, without the requirement that the rollback to the aborted transaction complete first.

When a transaction for a given row commits, Table 7 shows how the TBI, RAI, and RBI rows are handled by the access module 106.

TABLE 7

| Row State | Result |
|---|---|
| 01 (TBI) | 01 → x |
| 11 (RAI) | 11 → 00 |
| 10 (RBI) | 10 → x |

The TBI row (which contains the transaction before image) is deleted or is marked as being reusable by another transaction (0→x). The RAI row (which contains the request after image) is converted to have the row state 00 (11→00) to indicate that this is the current image of the row. Also, the MUTATION_ID field 204 is removed from the disk block 116 since a modification of the row is no longer occurring. The RBI (which contains the request before image) is deleted or marked as being reusable by another transaction (10→x). Also, once a transaction commits, the corresponding MUTATION_ID is also removed from each of the ACTIVE_MUTATION_ID and ABORT_MUTATION_ID lists 122 and 124.

If the file system 114 receives a non-stability read mode read request (that is, a read request that does not employ the stability read mode mechanism) for a row, Table 8 below indicates how the access module 106 processes the request given the row state of the affected row.

TABLE 8

| Row State | Result |
| --- | --- |
| 00 (I) | Pointer to row returned |
| 01 (TBI) | Row is ignored (as if not there) |
| 11 (RAI) | Pointer to row is returned |
| 10 (RBI) | Row is ignored (as if not there) |
| 01 (TBI) (abort) | Pointer to row is returned |
| 11 (RAI) (abort) | Row is ignored (as if not there) |
| 10 (RBI) (abort) | Pointer to row is returned |

The first four rows of Table 8 were explained in connection with Table 3 above. However, for a current modification operation that has been aborted, as indicated by "(abort)" in Table 8, the pointer to the TBI row or RBI row is returned, while the RAI row is ignored. The process of selecting a row to return to the AWT 104 in response to a read request is further explained below in connection with FIG. 11.

Figure 11:
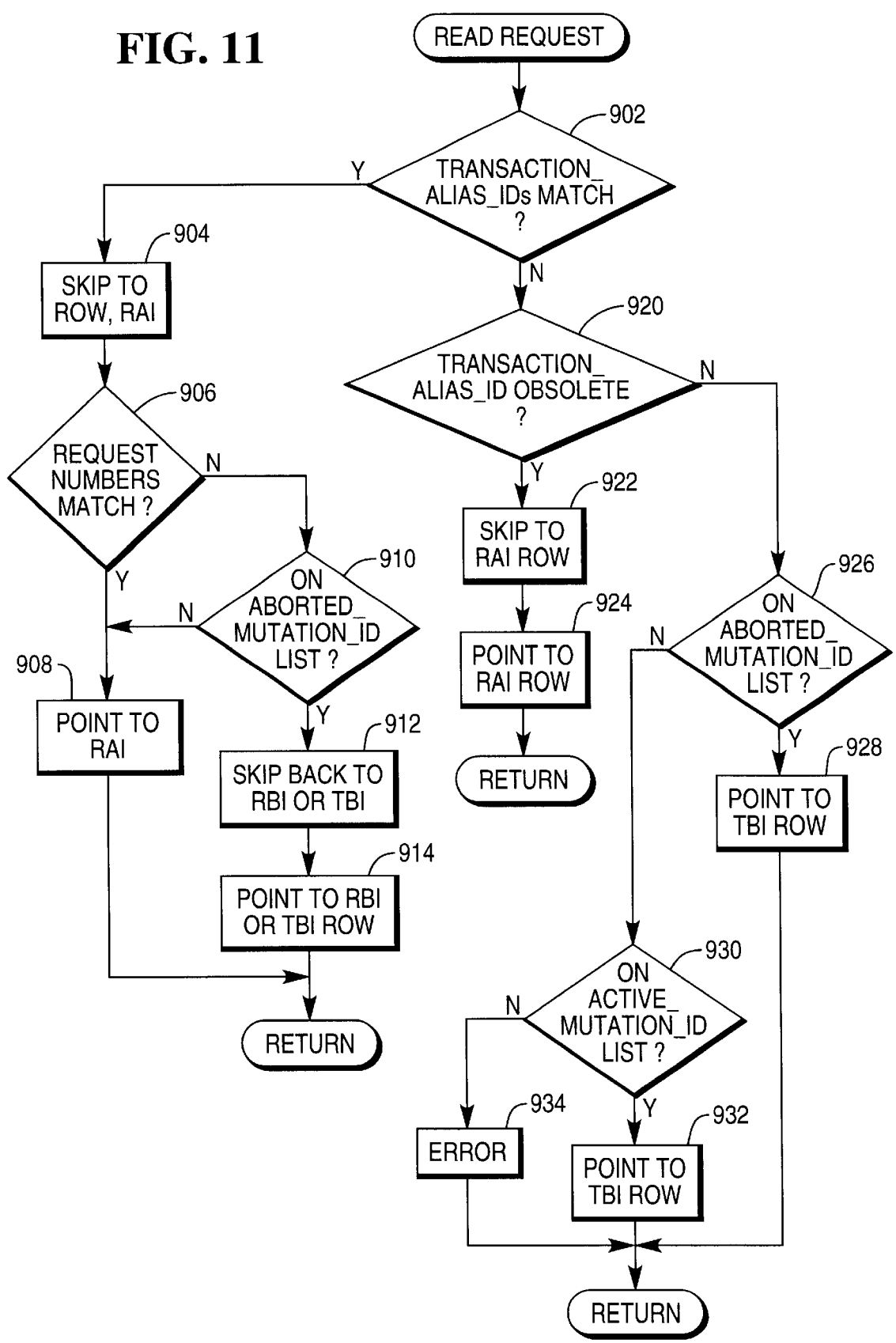
FIG. 11 is a flow diagram of a process responding to a read request for a row that is being modified.

FIG. 11 is a flow diagram of a process performed by the access module 106 (FIG. 2) in response to receipt of a non-stability read mode read request from an AWT 104, the read request being associated with a MUTATION_ID (from the context block 112). Generally, if the MUTATION_ID of the read request matches the MUTATION_ID of the row, then the RAI row (containing the request after image) is returned to the AWT 104. In the flow diagram, the access module 106 determines (at 902) if the TRANSACTION_ALIAS_ID of the read request and the TRANSACTION_ALIAS_ID of the requested row (based on the row identifier ROW_ID) matches. If so, the access module 106 skips (at 904) to the RAI row, and checks (at 906) if the REQUEST_NUMBER associated with the read request matches the REQUEST_NUMBER in the requested row. If so, the interface points (at 908) to the RAI row, which is the row returned by the access module 106 to the AWT 104 in response to the read request.

However, if the access module 106 determines (at 906) that the REQUEST_NUMBERs do not match (that is, the MUTATION_IDs of the read request and the requested row are not equal), then the access module 106 accesses (at 910) the ABORTED_MUTATION_ID list 124 to determine if the MUTATION_ID is on the list. If not, indicating that an abort operation is not occurring, the access module 106 points (at 908) to the RAI row. However, if the MUTATION_ID is on the ABORTED_MUTATION_ID list 124, then the access module 106 skips back (at 912) to the RBI row (or to the TBI row if the RBI row is not present). The access module 106 then points (at 914) to the RBI row or TBI row, which is returned in response to the read request.

The MUTATION_IDs of the read request and the requested row may also not match for another reason: the TRANSACTION_ALIAS_IDs do not match. If the access module 106 determines this is so at 902, then it checks to determine (at 920) if the TRANSACTION_ALIAS_ID is obsolete (that is, the MUTATION_ID is not on either the ACTIVE_MUTATION_ID list 122 or ABORTED_MUTATION_ID list 124). Since TRANSACTION_ALIAS_ID increments with each new transaction, the determination of whether MUTATION_ID is obsolete is based on determining if TRANSACTION_ALIAS_ID (from the context block 112) is less than a parameter OBSOLETE_BEGIN_RANGE. The parameter OBSOLETE_BEGIN_RANGE is set to the lowest of the TRANSACTION_ALIAS_IDs on the ACTIVE_MUTATION_ID list 122 and ABORTED_MUTATION_ID list 124. If obsolete, the access module 106 skips (at 922) to the RAI row and points (at 924) to the RAI row as the row to return in response to the read request.

If however, the TRANSACTION_ALIAS_ID is not obsolete, then the access module 106 checks (at 926) to determine if the MUTATION_ID is on the ABORTED_MUTATION_ID list 124. If so, the access module 106 points (at 928) to the TBI row as the row to return. If the MUTATION_ID is not on the ABORTED_MUTATION_ID list 124, the access module 106 then checks (at 930) to determine if the MUTATION_ID is on the ACTIVE_MUTATION_ID list 122. If so, then another transaction that updated this row is still in progress and the access module 106 points (at 932) to the TBI row to not let the current transaction see the uncommitted change. Optionally, it is valid to return the RAI row instead of the TBI row (932). This is done if the reading transaction specifies that dirty reads (reads of changes of uncommitted transactions) are allowed.

If, however, the MUTATION_ID is also not on the ACTIVE_MUTATION_ID list 122, then the access module 106 takes the error path (at 934) since this would be an impossible situation.

The access module 106 also passes the parameter OBSOLETE_BEGIN_RANGE to the file system 114 to allow the removal of old TBI or RBI rows from a block in a table when any row in a block is being updated. As the file system 114 accesses a block in the table, and if it determines that the TRANSACTION_ALIAS_ID field associated with any TBI or RBI row in the block is less than the OBSOLETE_BEGIN_RANGE, then the TBI or RBI row can be removed. It is also possible for a background process to perform this cleanup activity periodically or to be performed on an as needed basis if space runs low.

The access module 106 also controls how states of each row are transitioned based on an input request (e.g., insert row, delete row, or update row). State transition tables are illustrated below for the different input requests and different initial states of rows. Given a ROW_STATE value and an input command sent to the file system 114, an output is generated that represents the action performed by the file system 114 on the pertinent row(s). The symbols used in the state transition tables are as follows. The symbol (cr) represents that the operation is being performed on a row associated with the current request. The operation references the MUTATION_ID stored in the disk block 116 associated with the row instead of the MUTATION_ID field 110 in the context block 112 for the command. The symbol (or) indicates that the operation is being performed on a row associated with an old request, but a current transaction. The symbol (ot) indicates that the operation is being performed on a row associated with an old transaction. The symbol (ct) indicates that the operation is associated with a current transaction.

The output symbols are as follows: (nr) represents a new row; (u) represents update data; (x) represents a deleted row; and (opt) represents that the file system 114 may optionally delete the row if it needs room in the disk block 116.

The NEXT_ROW_STATE column shows the next state of the row(s) along with the following explanation: (g) to represent a good state or commit state as opposed to an abort state; (ar) to represent a request abort state based on the aborted MUTATION_ID list 124; (at) to represent a transaction abort state based on the aborted MUTATION_ID list 124; and (a) which is the same as (ar) or (at).

Table 9 below represents operations that can be performed on a row that does not exist (has state X). If the row does not yet exist, delete and update operations are not allowed; any attempt at deleting or updating a non-existent row produces an error. However, a row insert operation is allowed, and the new row (nr) has the row state 11, with the state indicated as good (g).

TABLE 9

| # | Row State | Inputs | Outputs | Next Row State |
|---|---|---|---|---|
| 1 | X | Insert | nr → 11 | 11(g) |
| 2 | | Delete | — | ERROR |
| 3 | | Update | — | ERROR |

Table 10 below represents operations performed on a row having state 00 (current image or I state). An insert operation (entry #1) is not allowed. A delete operation (entry #2) causes the access module 106 to change the state of the row from 00 to 01, with the row becoming the TBI row. An update operation (entry #3) causes the current row to become the TBI row (00→01) and a new row to be created that contains the content of the original row along with the updated (u) data. The new row has state 11 (RAI row).

TABLE 10

| # | Row State | Inputs | Outputs | Next Row State |
|---|---|---|---|---|
| 1 | 00(I) | Insert | — | ERROR |
| 2 | | Delete | 00 → 01 | 01 (g) |
| 3 | | Update | 00 → 01<br>00 + u → 11 | 01,11(g) |

Table 11 below involves operations on a TBI row. An insert operation (entry #1) on a row associated with a current request or old request in a current transaction causes a new row (nr) to be created with the 11 (RAI) state. The new row is created since the insert operation is not aware of the TBI row. The current row remains the TBI row, while the new row is the RAI row.

An insert operation (entry #2), performed on a row associated with an old transaction (ot) causes a new row (nr) to be created as an RAI row (ROW_STATE=11) while the TBI row associated with the old transaction can be removed (optionally) or marked as available for reuse.

A delete or update (entries #3 and 4) of the TBI row is not allowed and produces an error. In case of an abort of a current request (cr), as shown in entry #5, the row state remains 01 and is associated with the request abort (ar) state. The TBI row will be saved if the transaction commits (since it is only the request that aborted, not the transaction). In case of an abort of a current transaction (ct), as shown in entry #6, the row state remains 01 and is associated with the transaction abort (at) state. The row will be saved in the rollback process.

TABLE 11

| # | Row State | Inputs | Outputs | Next Row State |
|---|---|---|---|---|
| 1 | 01 (TBI) | Insert (cr,or) | nr → 11 | 11 (g)<br>01 (g) |
| 2 | | Insert (ot) | 01 → x (opt)<br>nr → 11 | 11 (g)<br>01 (g) |
| 3 | | Delete | — | ERROR |
| 4 | | Update | — | ERROR |
| 5 | | Abort (cr) | | 01 (ar) |
| 6 | | Abort (ct) | | 01 (at) |

Table 12 below is the transition table for an RAI row. An insert (entry #1) into an RAI row is not allowed, and produces an error. A delete operation of a row (entry #2) associated with a current request (cr) causes the row state to transition from 11 to x, which marks the row as being deleted or reusable by another transaction. Since the row was not there at the beginning of the current request, then the row should be removed.

A delete operation (entry #3) of a row associated with an old request (or) causes the row state to transition from 11 to 10 so that the RAI row of the previous request becomes the RBI row. A delete operation (entry #4) of a row associated with an old transaction (ot) will cause the RAI row to become the TBI row (11→01).

An update operation (entry #5) of a row associated with a current request (cr) causes the RAI row to be updated (11+u) and maintain the 11 row state. Since the update is for the same request, a new before image row is not needed.

If an update operation (entry #6) is performed on a row associated with an old request (or), however, a new row is created containing the updated image (11+u), which has the 11 row state, while the previous RAI row becomes an RBI row (11→10). An update operation (entry #7) of a row associated with an old transaction causes the RAI row to become the TBI row (11→01) while a new row is created including the updated row (11+u), which has the row state 11.

The row state of the RAI row remains 11 in response to an abort (entry #8) of the current request or transaction (cr, ct), but will be deleted by a rollback process.

TABLE 12

| # | Row State | Inputs | Outputs | Next Row State |
|---|---|---|---|---|
| 1 | 11 (RAI) | Insert | — | ERROR |
| 2 | | Delete (cr) | 11 → x | X |
| 3 | | Delete (or) | 11 → 10 | 10 (g) |
| 4 | | Delete (ot) | 11 → 01 | 01 (g) |
| 5 | | Update (cr) | 11 + u → 11 | 11 (g) |
| 6 | | Update (or) | 11 → 10 | 10,11 (g) |
| 7 | | Update (ot) | 11 → 01<br>11 + u → 11 | 01,11 (g) |
| 8 | | Abort (cr,ct) | | 11 (a) |

Table 13 below shows processing of an RBI image. If the operation is an insert operation (entry #1) of a row associated with a current request (cr), then a new row (nr) is created having row state 11 since the RBI row is not found by the insert operation. Both the RBI and RAI rows will have the same MUTATION_ID value.

An insert operation (entry #2) of a row associated with an old request or old transaction (or, ot) will cause the row to be optionally deleted (10→x), with a new row (nr) created with the row state 11.

A delete or update operation (entries #3 and 4) of an RBI row is not allowed. An abort (entry #5) of a current request will cause the row to maintain the 10 row state with a request abort (ar) state. The row will be saved once the transaction commits. An abort (entry #6) of a current transaction will cause the row to maintain the 10 row state with a transaction abort (at) state. The row will be deleted by a rollback process.

TABLE 13

| # | Row State | Inputs | Outputs | Next Row State |
|---|-----------|--------|---------|----------------|
| 1 | 10 (RBI)  | Insert (cr) | nr → 11 | 11 (g) |
|   |           |        |         | 10 (g) |
| 2 |           | Insert (or,ot) | 10 → x (opt) | 11 (g) |
|   |           |        | nr → 11 | 10 (g) |
| 3 |           | Delete | —       | ERROR  |
| 4 |           | Update | —       | ERROR  |
| 5 |           | Abort (cr) |     | 10 (ar) |
| 6 |           | Abort (ct) |     | 10 (at) |

Table 14 below shows the processing of a row (associated with a given ROW_ID) that is associated with a TBI row and an RAI row. An insert operation (entry #1) into the row is not allowed and produces an error. A delete operation (entry #2) associated with a current request (cr) causes the RAI row to be deleted since the delete operation is part of the same request that created the 11 state.

A delete operation (entry #3) on a row associated with an old request (or) causes the RAI row to become the TBI row (11→10) since the current delete request is different than a request that created the 11 state. A delete operation (entry #4) on a row associated with an old transaction (ot) causes the TBI row to be deleted (01→x), while the RAI row is made the TBI row (11→01).

An update operation (entry #5) on a row associated with a current request (cr) causes the RAI row to be replaced with the updated row (with the row state remaining as 11). The TBI row remains unchanged.

An update operation (entry #6) on a row associated with an old request (or) causes the RAI row to be changed to the RBI row (11→10), and a new row to be added (having row state 11) that contains the updated RAI row. The TBI row remains unchanged. As a result of this operation, three rows are present: the TBI row, the RBI row (which was the previous RAI row), and a new RAI row.

An update operation (entry #7) on a row associated with an old transaction (ot) causes the TBI row to be deleted (01→x), the RAI row to be changed to the TBI row (11→01), and a new row (having row state 11) to be added that contains the updated RAI row. Two rows remain as a result of this operation: the TBI row (previous RAI row) and the newly created RAI row.

An abort (entry #8) of a current request (cr) will cause the TBI and RAI rows to maintain their respective 01 and 11 row states and be associated with the request abort (ar) state. The RAI row will be deleted as a result of a rollback operation. An abort (entry #9) of a current transaction (ct) will cause the TBI and RAI rows to maintain their respective 01 and 11 row states and be associated with the transaction abort (at) state. The RAI image will be deleted as a result of a rollback operation, while the TBI row will be restored as the current image.

TABLE 14

| # | Row State | Inputs | Outputs | Next Row State |
|---|-----------|--------|---------|----------------|
| 1 | 01,11     | Insert | —       | ERROR          |
| 2 |           | Delete (cr) | 11 → x | 01 (g) |
| 3 |           | Delete (or) | 11 → 10 | 01,10 (g) |
| 4 |           | Delete (ot) | 01 → x | 01 (g) |
|   |           |        | 11 → 01 |               |
| 5 |           | Update (cr) | 11 + u → 11 | 01,11 (g) |
| 6 |           | Update (or) | 11 → 10 | 01,10,11 (g) |
|   |           |        | 11 + u → 11 |           |
| 7 |           | Update (ot) | 01 → x | 01,11 (g) |
|   |           |        | 11 → 01 |               |
|   |           |        | 11 + u → 11 |           |
| 8 |           | Abort (cr) |     | 01,11 (ar) |
| 9 |           | Abort (ct) |     | 01,11 (at) |

Table 15 below shows processing of a row associated with an RBI row and an RAI row. An insert operation (entry #1) produces an error. However, a delete operation (entry #2) of a row associated with a current request causes the row to be deleted. A delete operation (entry #3) of a row associated with an old request in the current transaction causes the RBI row to be deleted while the RAI row becomes the RBI row (11→10). A delete operation (entry #4) of a row associated with an old transaction causes the RBI row to be deleted and the RAI row to become the TBI row (11→01).

An update operation (entry #5) of a row associated with the current request causes the RAI row to be replaced with the updated image. An update operation (entry #6) of a row associated with an old request in the current transaction causes the RBI row to be deleted, the RAI row to become the RBI row, and a new RAI row to be created that contains the updated image (11+u). An update operation (entry #7) of a row associated with an old transaction causes the RBI row to be deleted, the RAI row to become the TBI row, and a new row to be created that contains the updated RAI row.

An abort (entry #8) of the current request causes the rows to maintain their respective row states and be associated with the request abort (ar) state. The rollback process will keep the RBI image. An abort (entry #9) of the current transaction causes the rows to maintain their respective states, but both rows will be deleted in the rollback process.

TABLE 15

| # | Row State | Inputs | Outputs | Next Row State |
|---|-----------|--------|---------|----------------|
| 1 | 10,11     | Insert |         | ERROR          |
| 2 |           | Delete (cr) | 11 → x | 10 (g) |
| 3 |           | Delete (or) | 10 → x | 10 (g) |
|   |           |        | 11 → 10 |               |
| 4 |           | Delete (ot) | 10 → x | 01 (g) |
|   |           |        | 11 → 01 |               |
| 5 |           | Update (cr) | 11 + u → 11 | 10,11, (g) |
| 6 |           | Update (or) | 10 → x | 10,11 (g) |
|   |           |        | 11 → 10 |               |
|   |           |        | 11 + u → 11 |           |
| 7 |           | Update (ot) | 10 → x | 01,11 (g) |
|   |           |        | 11 → 01 |               |
|   |           |        | 11 + u → 11 |           |
| 8 |           | Abort (cr) |     | 10,11 (ar) |
| 9 |           | Abort (ct) |     | 10,11 (at) |

Table 16 below shows processing of a row associated with a TBI row and an RBI row. An insert (entry #1) into the row causes a new row to be created that has the 11 row state. The inserted row is unrelated to the previous TBI and RBI rows.

A delete operation (entry #2) and update operation (entry #3) are not allowed since the TBI and RBI rows cannot be found. An abort (entry #4) of the current request causes the rows to maintain their respective states, but the RBI row will become the current row upon rollback. An abort (entry #5) of the current transaction causes the rows to maintain their respective states, but the TBI row will become the current row upon rollback.

TABLE 16

| # | Row State | Inputs | Outputs | Next Row State |
|---|---|---|---|---|
| 1 | 01,10 | Insert (cr,or,ot) | nr → 11 | 11 (g) Unrelated: 01,10 (g) |
| 2 | | Delete | — | ERROR |
| 3 | | Update | — | ERROR |
| 4 | | Abort (cr) | | 01,10 (ar) |
| 5 | | Abort (ct) | | 01,10 (at) |

Table 17 below shows processing of a row associated with a TBI row, RBI row, and RAI row. An insert operation (entry #1) is not allowed.

A delete operation (entry #2) of a row associated with the current request causes the RAI row to be deleted (since it is the RAI of the current request and the RBI image already exists). A delete operation (entry #3) of arrow associated with an old request in the current transaction causes the RBI row to be deleted while the RAI row becomes the RBI row. A delete operation (entry #4) of a row associated with an old transaction causes the RAI row to become the TBI row and the TBI and RBI rows to be deleted.

An update operation (entry #5) of a row associated with the current request causes the RAI row to be updated (while maintaining the same row state). An update operation (entry #6) of a row associated with an old request causes the RBI row to be deleted, the RAI row to be changed to the RBI row, and a new RAI row to be added containing the updated image. An update operation (entry #7) of a row associated with an old transaction causes the TBI and RBI rows to be deleted and the RAI row to be changed to the TBI row. A new RAI row is added that contains the updated image.

An abort (entry #8) of a current request causes the rows to maintain their respective states, with the RAI row deleted in the rollback process. An abort (entry #9) of a current transaction causes the rows to maintain their respective states, with all rows removed by the rollback process except the TBI row.

TABLE 17

| # | Row State | Inputs | Outputs | Next Row State |
|---|---|---|---|---|
| 1 | 01,10,11 | Insert | — | ERROR |
| 2 | | Delete (cr) | 11 → x | 01,10 (g) |
| 3 | | Delete (or) | 10 → x<br>11 → 10 | 01,10,11 (g) |
| 4 | | Delete (ot) | 11 → 01<br>10 → x<br>01 → x | 01 (g) |
| 5 | | Update (cr) | 11 + u → 11 | 01,10,11 (g) |
| 6 | | Update (or) | 10 → x<br>11 → 10<br>11 + u → 11 | 01,10,11 (g) |
| 7 | | Update (ot) | 01 → x<br>10 → x<br>11 → 01<br>11 + u → 11 | 01,11 (g) |
| 8 | | Abort (cr) | | 01,10,11 (ar) |
| 9 | | Abort (ct) | | 01,10,11 (at) |

Figure 12:
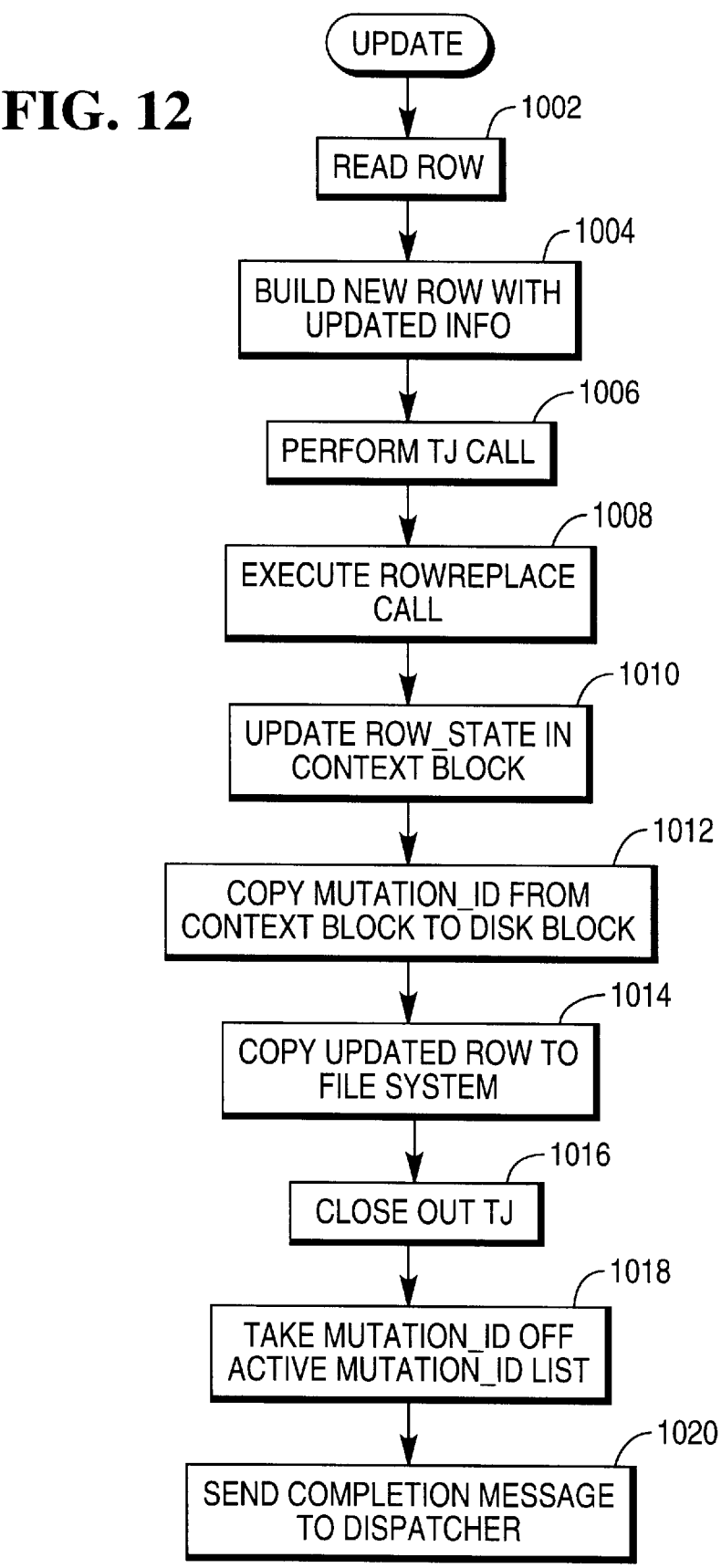
FIG. 12 is a flow diagram of an update operation in one example embodiment.

Referring to FIG. 12, an example process for updating a row is illustrated. A row update involves first reading the row from a table, updating the content of the row, and writing the row back to the table. The read request is submitted by the AWT 104 (at 1002) as a file system call. The retrieved row is sent to the AWT 104, which builds (at 1004) a new row with the updated information. A call to the transient journal is performed (at 1006) to write to the journal the original read row (the before image). Next, a RowReplace file system call is performed (at 1008), in which the ROW_STATE field 108 in the context block 112 pointing at the row to be replaced is changed (at 1010) from 00 to 01 (transaction before image). The MUTATION_ID field 110 is copied (at 1012) from the context block 112 to the disk block 116. The MUTATION_ID is also added to the ACTIVE_MUTATIO_ID list 122. The updated row is then copied (at 1014) ti the file system 114. The updated row has ROW_STATE equal 11 (request after image). The MUTATION_ID field 110 in the context block 112 is also associated with this row. The row identifier (ROW_ID) remains the same.

When the transaction commits, the end processing includes closing out (at 1016) the transient journal 118 to end the transaction, removing (at 1018) the MUTATION_ID of the row from the ACTIVE_MUTATION_ID list, and sending a completion message (at 1020) to the dispatcher 102.

Instructions of the various software routines or modules discussed herein may be stored on one or more storage units in the corresponding systems and loaded for execution on corresponding control units. The control units include microprocessors, microcontrollers, processor cards (including one or more microprocessors or microcontrollers), or other control or computing devices. As used here, a "controller" refers to hardware, software, or a combination thereof. A "controller" can refer to a single component or to plural components (whether software or hardware).

The storage units may include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact disks (CDs) or digital video disks (DVDs). Instructions that make up the various software routines or modules in a node and stored in a respective storage unit when executed by a control unit cause the corresponding system to perform programmed acts.

The instructions of the software routines or modules are loaded or transported into the system in one of many different ways. For example, code segments including instructions stored on floppy disks, CD or DVD media, a hard disk, or transported through a network interface card, modem, or other interface device may be loaded into the node and executed as corresponding software routines or modules. In the loading or transport process, data signals that are embodied in carrier waves (transmitted over telephone lines, network lines, wireless links, cables, and the like) may communicate the code segments, including instructions, to the node. Such carrier waves are in the form of electrical, optical, acoustical, electromagnetic, or other types of signals.

While the present invention has been described with respect to a limited number of embodiments, those skilled in the art will appreciate numerous modifications and variations therefrom. It is intended that the appended claims cover such modifications and variations as fall within the true spirit and scope of this present invention.

What is claimed is:

1. A database system, comprising:
   a storage module containing a table having plural portions; and
   a lock manager adapted to place a table-level lock on the table for a first transaction, the first transaction updating a first portion of the table,
   the lock manager adapted to further establish a lower level lock to lock the first table portion in response to a second transaction requesting an access of the first portion of the table, wherein the table-level lock comprises a table-level write lock, and wherein the first portion comprises a row, the database system further comprising a controller adapted to issue a read request for the row in the second transaction and to call the lock manager to place a table-level read lock for the second transaction.

2. The database system of claim 1, wherein the lock manager is adapted to establish a row-level lock, the lower level lock comprising the row-level lock.

3. The database system of claim 1, wherein the first portion of the table comprises a row of the table.

4. The database system of claim 1, wherein the controller is adapted to determine if a conflict exists between the read request and another operation.

5. The database system of claim 4, wherein the controller is adapted to determine if the conflict exists by checking for information indicating that data to be accessed by the read request is being modified.

6. The database system of claim 5, wherein the information comprises a mutation identifier for the first portion of the table.

7. The database system of claim 6, wherein the controller is adapted to create the mutation identifier for the first portion in response to the first portion being modified.

8. The database system of claim 1, wherein the controller is adapted to determine if a conflict exists between the first and second transactions for the given row.

9. The database system of claim 8, wherein the controller is adapted to determine if the conflict exists by retrieving information indicating the row being modified.

10. The database system of claim 8, wherein the controller is adapted to call the lock manager to place a row-level write lock for the first transaction and a row-level read lock for the second transaction.

11. The database system of claim 10, wherein the controller comprises one or more software routines.

12. The database system of claim 1, wherein the lock manager is adapted to concurrently maintain the lower level lock and the table-level lock.

13. The database system of claim 1, wherein the lock manager is adapted to establish the lower level lock to resolve a conflict between the second transaction and the first transaction.

14. A database system, comprising:
   a storage module to store a table, the table containing portions of data and one or more indications to indicate corresponding one or more of the data portions being modified; and
   a controller adapted to perform lock management using the one or more indications contained in the table,
   wherein the controller is adapted to perform lock management by determining a conflict between two or more locks using the one or more indications, wherein the two or more locks are table-level locks,
   wherein the controller is adapted to establish a row-level lock in addition to the table-level lock if the conflict is determined.

15. The database system of claim 14, wherein the table-level locks comprise a table-level write lock for a first transaction and a table-level read lock for a second transaction.

16. The database system of claim 15, wherein the controller is adapted to establish a row-level write lock in addition to the table-level write lock and a row-level read lock in addition to the table-level read lock.

17. The database system of claim 14, wherein the controller comprises a lock manager.

18. The database system of claim 17, wherein the controller further comprises one or more access tasks adapted to issue read or update requests and to call the lock manager to place locks.

19. An article comprising at least one storage medium containing instructions that when executed cause a system to:
   issue a first table-level lock for a first transaction;
   determine if a conflict exists for a row between the first transaction and a second transaction;
   establish a row-level lock in addition to the first table-level lock for the row of the table in response to the conflict; and
   issue a second table-level lock for the second transaction, and wherein determining if the conflict exists comprises determining if a conflict exists between the first and second table-level locks.

20. The article of claim 19, wherein the instructions when executed cause the system to further establish a row-level read lock for the row in response to the conflict.

21. The article of claim 20, wherein the instructions when executed cause the system to further block the row-level read lock while a row-level write is being processed.

22. A method for use in a database system, comprising:
   storing a table containing plural portions in a storage module;
   storing mutation information for each table portion being modified;
   performing lock management for access to the plural portions based on the mutation information, wherein performing the lock management comprises placing a table-level write lock on the table in response to no conflict being detected, and placing the table-level write lock in addition to a row-level lock in response to a conflict being detected; and
   placing a table-level read lock for a second transaction in response to a read request of the second transaction.

23. The method of claim 22, further comprising providing a Read Committed isolation level using the lock management based on the mutation information.

24. The method of claim 22, further comprising storing plural images of each table portion being modified, the plural images comprising a first image before modification and a second image after modification.

25. The method of claim 24, further comprising providing the first image in response to a read request for the table portion.

26. The method of claim 25, wherein the lock management based on the mutation information and providing the first image in response to the read request enables providing a Read Repeatable isolation level.

27. An article comprising at least one storage medium containing instructions that when executed cause a database system to:
- store a table containing plural rows;
- store information indicating if each of the plural rows is being modified;
- provide a first table-level lock for a first transaction accessing one of the rows;
- provide a second table-level lock for a second transaction accessing the table;
- determine if a conflict exists between the first and second transactions for the one row based on the information; and
- establish a row-level lock of the one row for the first transaction and a row-level lock of the one row for the second transaction in response to determining the conflict.

28. The article of claim 27, wherein the instructions when executed cause the database system to provide the first table-level lock as a table-level write lock and provide the second table-level lock as a table-level read lock.

29. The article of claim 28, wherein the instructions when executed cause the database system to establish the row-level lock for the first transaction as a row-level write lock and to establish the row-level lock for the second transaction as a row-level read lock.

30. The article of claim 27, wherein the instructions when executed cause the database system to establish the row-level locks in addition to the table-level locks.

* * * * *